United States Patent [19]
Inou et al.

[11] Patent Number: 5,349,523
[45] Date of Patent: Sep. 20, 1994

[54] SWITCHING POWER SUPPLY

[75] Inventors: Kiyoharu Inou; Hitoshi Yasui; Shunsuke Hayashi, all of Tokyo, Japan

[73] Assignee: Yokogawa Electric Corporation, Tokyo, Japan

[21] Appl. No.: 47,226

[22] Filed: Apr. 14, 1993

[30] Foreign Application Priority Data

Feb. 22, 1993 [JP] Japan .................................. 5-031826

[51] Int. Cl.⁵ ......................................... H02M 3/335
[52] U.S. Cl. ....................................... 363/97; 363/21; 364/483
[58] Field of Search ...................... 363/20, 21, 97, 131; 364/480, 481, 483

[56] References Cited

U.S. PATENT DOCUMENTS

| | | | |
|---|---|---|---|
| 4,521,672 | 6/1985 | Fronius | 219/130.33 |
| 5,019,717 | 5/1991 | McCurrey et al. | 307/66 |
| 5,128,855 | 7/1992 | Hilber et al. | 364/132 |

*Primary Examiner*—Steven L. Stephan
*Assistant Examiner*—Adolf Berhane
*Attorney, Agent, or Firm*—Moonray Kojima

[57] ABSTRACT

A switching power supply comprising a converting circuit; an analog-to-digital converter for converting a signal referring to an output signal from the converting circuit into digital form; a parallel-to-series converter for converting a bit train signal containing the output signal from the analog-to-digital converter into a pulse train; an isolation means for transmitting the pulse train to the primary winding of a transformer while concurrently electrically isolating the pulse train; a series-to-parallel converter for demodulating the pulse train into a parallel signal; and a control circuit. The converting circuit has a switching device which turns ON and OFF the voltage applied across the primary winding. The converting circuit provides rectification and smoothing of voltage induced in the secondary winding of the transformer, and supplies an output DC voltage to a load. The control circuit calculates control output for regulating the output voltage from the converting circuit which is received also by the series-to-parallel converter, to a given voltage. The control circuit further acts to produce an output signal which turns ON and OFF the switching device.

4 Claims, 19 Drawing Sheets

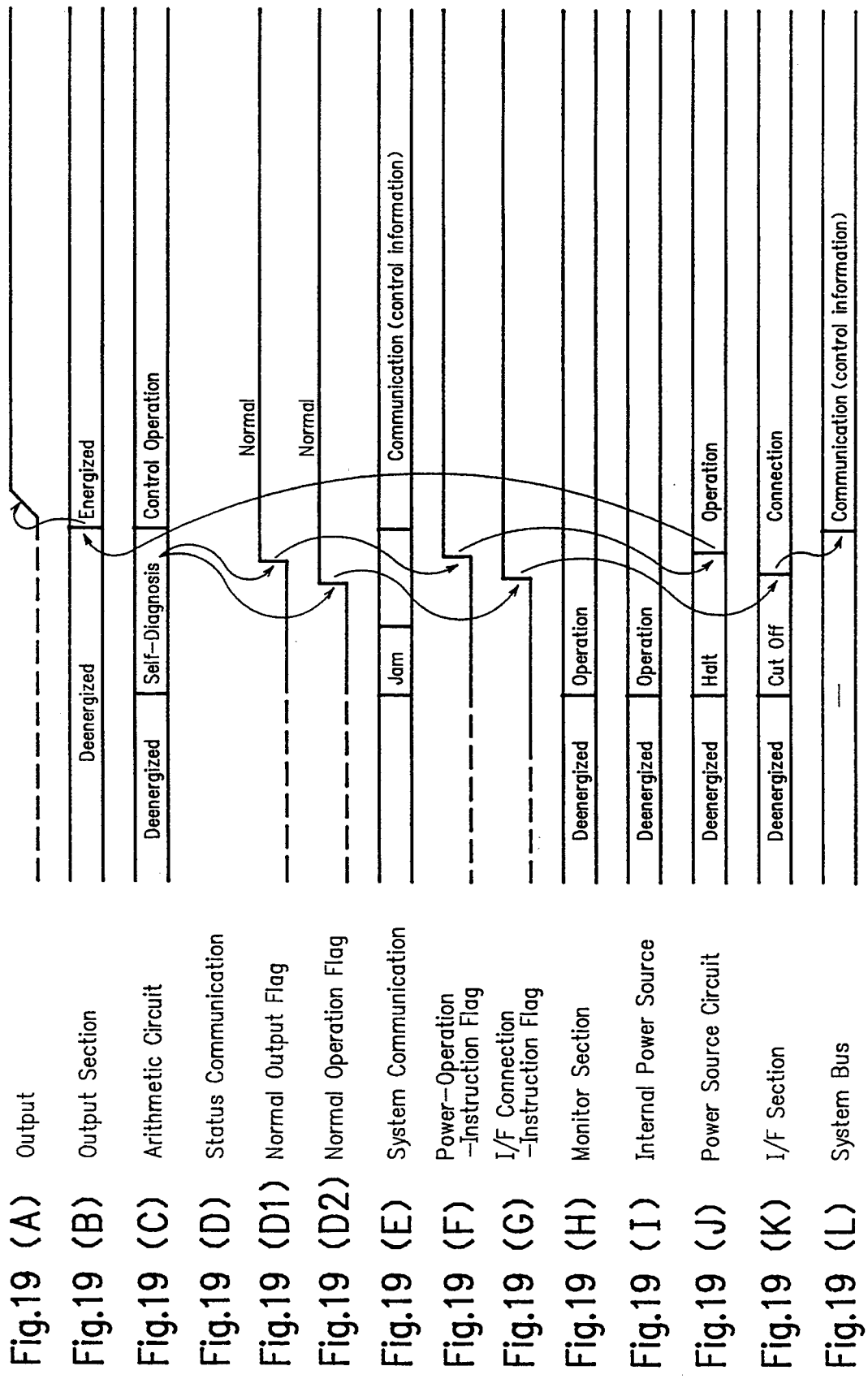

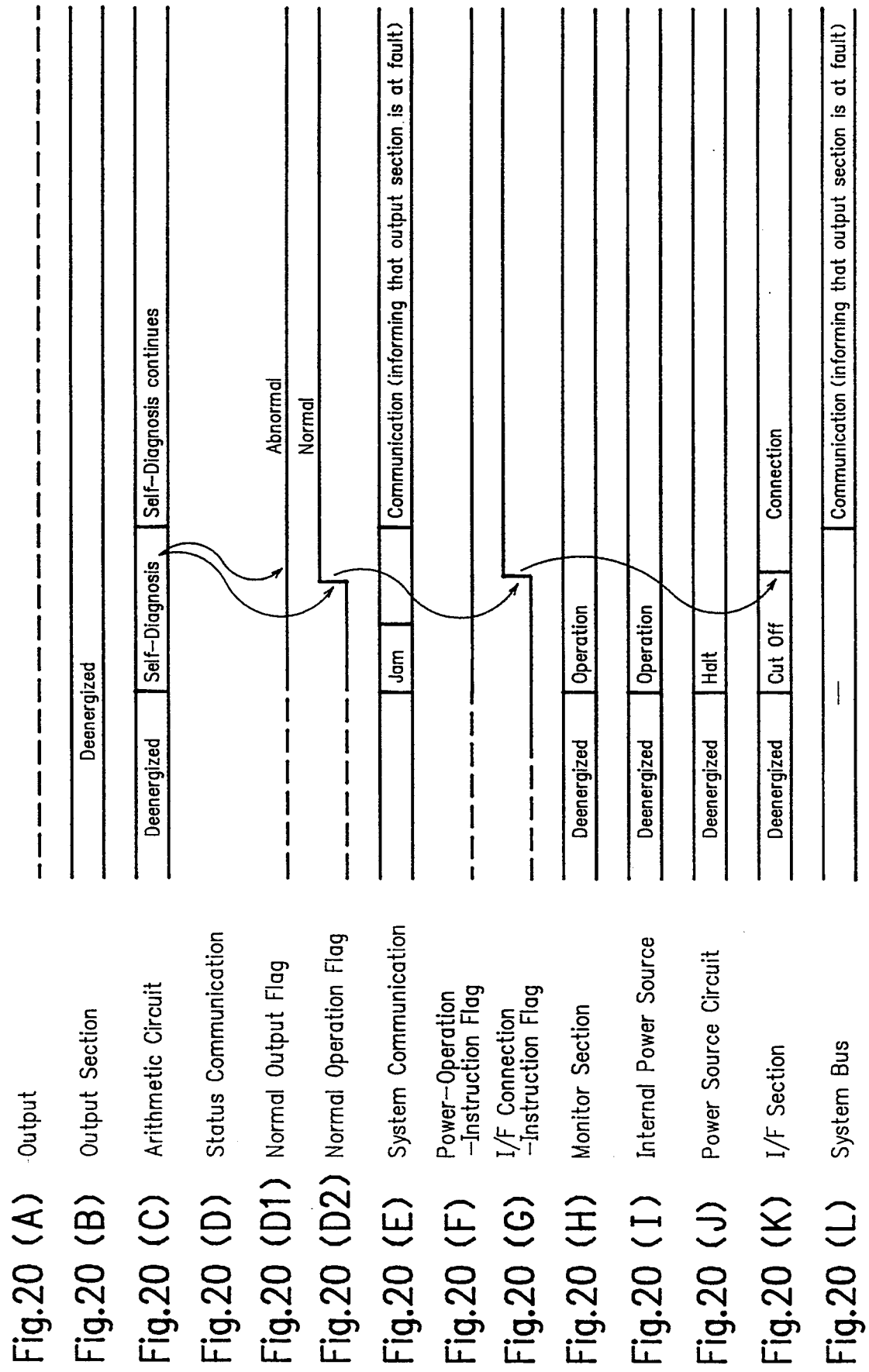

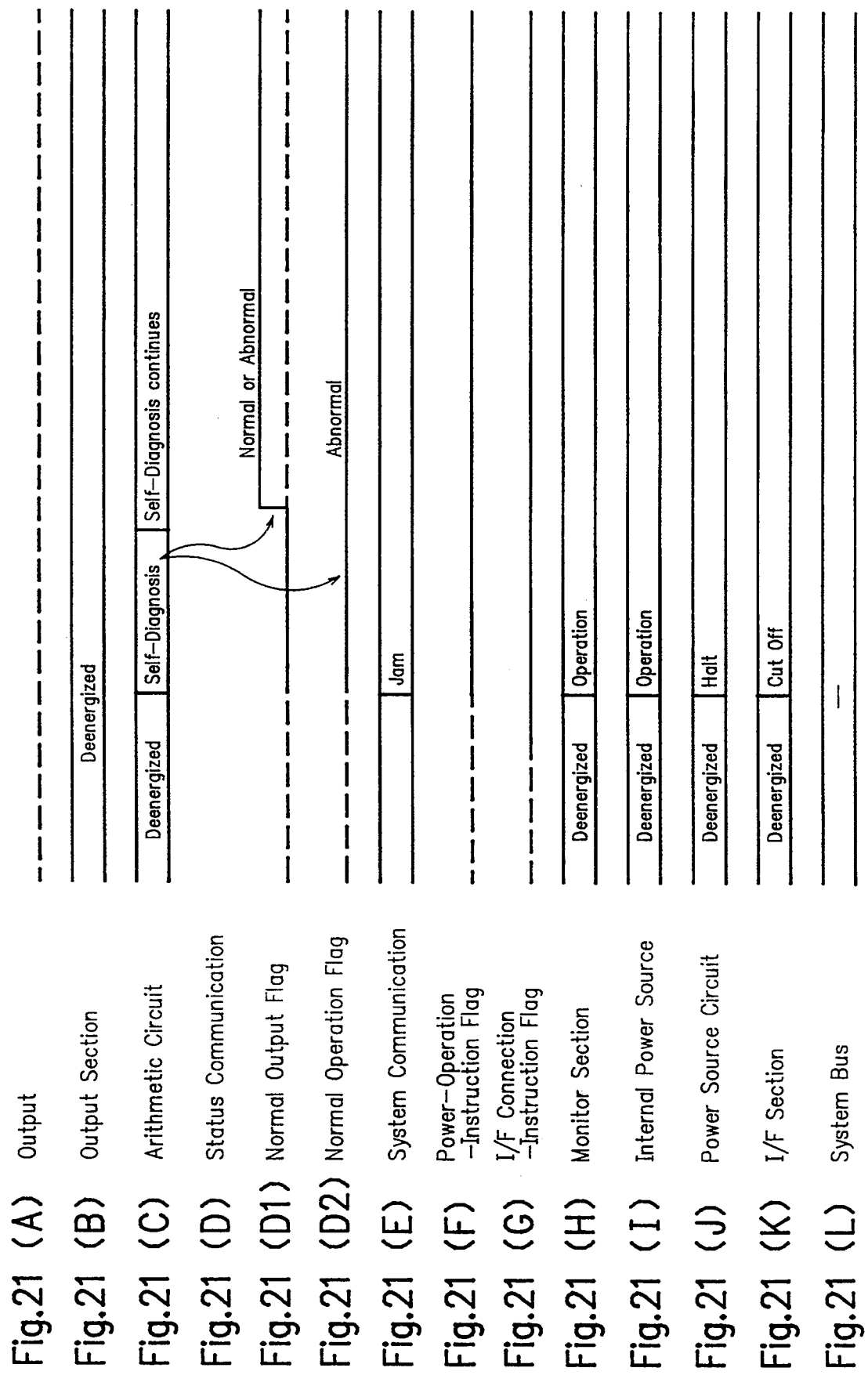

SWITCHING POWER SUPPLY

BACKGROUND OF THE INVENTION

1. Field of Invention

This invention relates to a switching power supply which produces a DC voltage of a preset value at a circuit on the secondary side of a transformer and feeds an output signal thereof back to the primary side of the transformer while electrically isolating the output signal.

2. Description of the Prior Art

FIG. 1 depicts a conventional switching power supply, wherein a DC converting circuit 10 receives a DC voltage Vin from a DC source 1 and converts the DC voltage into a stable output voltage $V_o$. A transformer 3 is provided to isolate the output side from the input side. For example, DC source 1 is a circuit for rectifying and smoothing AC power from an AC power source. Depending on the condition of the power source, this voltage may vary greatly, or a surge voltage or current may be superimposed on the voltage. If such an overvoltage or overcurrent is applied directly to a load 25, the load 25 may be damaged. Thus, transformer 3 provides isolation between the circuit connected to the primary side of transformer 3 and the circuit connected to the secondary side thereof.

DC converting circuit 10 has DC source 1 connected to one end of primary winding 5 of transformer 3, while a switching element or device Q1 is connected to the other end of primary winding 5. A rectifying-smoothing circuit 9 is connected to secondary winding 7 of transformer 3. Circuit 9 comprises a rectifying diode D1 and a low-pass filter including a smoothing choke coil L1 and a smoothing capacitor C1. When diode D1 is cut off, a flywheel diode D2 continuously passes current through coil L1.

When switching device Q1 is turned ON and OFF, the voltage from DC source 1 is intermittently applied to primary winding 5. Hence, a voltage is induced across secondary winding 7. This induced voltage is rectified and smoothed by circuit 9, whereby DC output voltage $V_o$ is produced. The output voltage $V_o$ is supplied to load 25 which is connected to output terminals 11,13.

A differential amplifier 15 compares DC output voltage $V_o$ with a preset voltage $V_r$ and produces an error signal according to differences therebetween, i.e. $V_r - V_o$. This error signal is fed back to a control circuit 23 while being isolated by a photocoupler 19. Control circuit 23 controls the ratio of conducting period of the switching device Q1 to the total period (of conducting and non-conducting periods of device Q1) so that the power supply will operate in such a manner as to substantially eliminate the error signal. That is, control circuit 23 performs a pulse-width modulation. Let $T_{ON}$ be the non-conducting period. If $T_{ON}/(T_{ON}+T_{OFF})$ is increased, the amount of energy supplied to the secondary winding 7 via transformer 3 is increased and output voltage $V_o$ is increased. Conversely, if the above ratio is reduced, the output voltage $V_o$ is decreased.

An overvoltage or overcurrent may be produced at output terminals 11,13 for some reason. If so, load 25 may be damaged, or the power supply itself may be damaged. To prevent such desired problems, an excessive output detector 17 is provided to monitor the condition of the output signal. If an excessively large output $V_o$ is produced, detector 17 produces an output signal indicating that this excessively large output $V_o$ is being produced. A photocoupler 21 transmits this signal to control circuit 23 while concurrently isolating such signal. Control circuit 23 then no longer activates switching device Q1. Then, intermittent application of voltage $V_{in}$ to primary winding 5 is stopped. The voltage induced across secondary winding 7 disappears. The result is that DC output voltage $V_o$ becomes zero.

The switching power supply is normally installed in an environment where temperature varies greatly. Also, voltage Vin from source 1 supplied to the primary side of transformer 3 is changed greatly according to the condition of the power source. Under these conditions, it is not easy to stably transmit the error signal as an accurate analog signal from amplifier 15 to control circuit 23 because of the thermal characteristics of components of the power supply, such as semiconductor devices, and poor resistance of the analog network to noise.

Furthermore, it is not easy for the receiver section to extract different kinds of signals which are superimposed on each other and transmitted by the transmitter section. Accordingly, the circuit for transmitting the error signal and the circuit for transmitting the signal indicating the presence or absence of or excessively large output are provided separately. In the described conventional power supply, the error signal and the output signal from the excessive output detector are analog signals to be transmitted. The photocouplers 19 and 21 correspond to independent transfer circuits, and are used to perform electrical isolation between the circuits.

In recent years, electronic intelligence has enjoyed wider acceptance. With this increasing trend, the kinds of information transmitted between the secondary side of the power supply and the primary side thereof, are numerous in number and include the error signal, overcurrent output, overvoltage output, etc. Also, the amount of information being utilized is likely to increase. However, in conventional switching power supplies, each time a new kind of information is needed, an additional photocoupler is needed so that there is always the isolation between the information source and the control circuit using such information. This increases cost and amount of electrical power consumed.

Thus, conventional switching power supplies still leave much room for improvement.

SUMMARY OF THE INVENTION

Accordingly, an object of the invention is to overcome the aforementioned and other deficiencies and disadvantages of the prior art.

Another object is to provide a switching power supply, wherein the amount of information transmitted between the secondary side and the power supply and the primary side thereof is increased without increasing the number of isolating devices therebetween.

The foregoing and other objects are attained by the invention which encompasses a switching power supply comprising a DC converting circuit which turns ON and OFF the voltage applied across the primary winding of a transformer by a switching device and which provides rectification and smoothing of the voltage induced in the secondary winding of the transformer to supply a DC voltage to a load; an analog-to-digital converter which converts a signal representing the output voltage from the DC converting circuit into a digital form; a parallel-to-serial converter which converts a bit train signal including the output signal from the analog-to-digital converter into a serial pulse train signal; an isolating means which permits transfer of the pulse train signal to the primary winding while concurrently isolating the pulse train signal; a serial-to-parallel converter which demodulates the pulse train signal introduced via the isolating means into a parallel signal; and a control circuit that calculates a control output for regulating that output voltage from the DC converting circuit which is received by the serial-to-parallel converter to a given voltage, the control circuit further acting to produce an output signal to turn ON and OFF the switching device.

The analog-to-digital converter converts the output voltage from the DC converting circuit into a digital signal of a given number of bits. The parallel-to-serial converter converts the contents of the digital signal into a serial pulse train signal in the order of the arrayed bits and transmits the serial pulse train signal. Thus, only one isolating element, such as a photocoupler, is needed to transmit the signal from the secondary side to the primary side while concurrently isolating the signal. The control circuit performs calculations according to the output signal from the DC converting circuit received by the serial-to-parallel converter to regulate the output voltage, and turns ON and OFF the switching device.

BRIEF DESCRIPTION OF THE DRAWINGS

FIGS. 19(A)–19(L) are waveform diagrams depicting normal operation of the embodiment of FIG. 17.

FIGS. 20(A)–20(L) are waveform diagrams, similar to those of FIGS. 19(A)–19(L), depicting operation of the embodiment of FIG. 17 when output section 25 is found to have a fault during energization.

FIGS. 21(A)–21(L) are waveform diagrams, similar to those of FIGS. 19(A)–19(L), depicting operation of the embodiment of FIG. 17 when the arithmetic function of arithmetic circuit 75 is found to have a fault during energization.

DETAILED DESCRIPTION OF THE PREFERRED EMBODIMENTS

Figure 1:
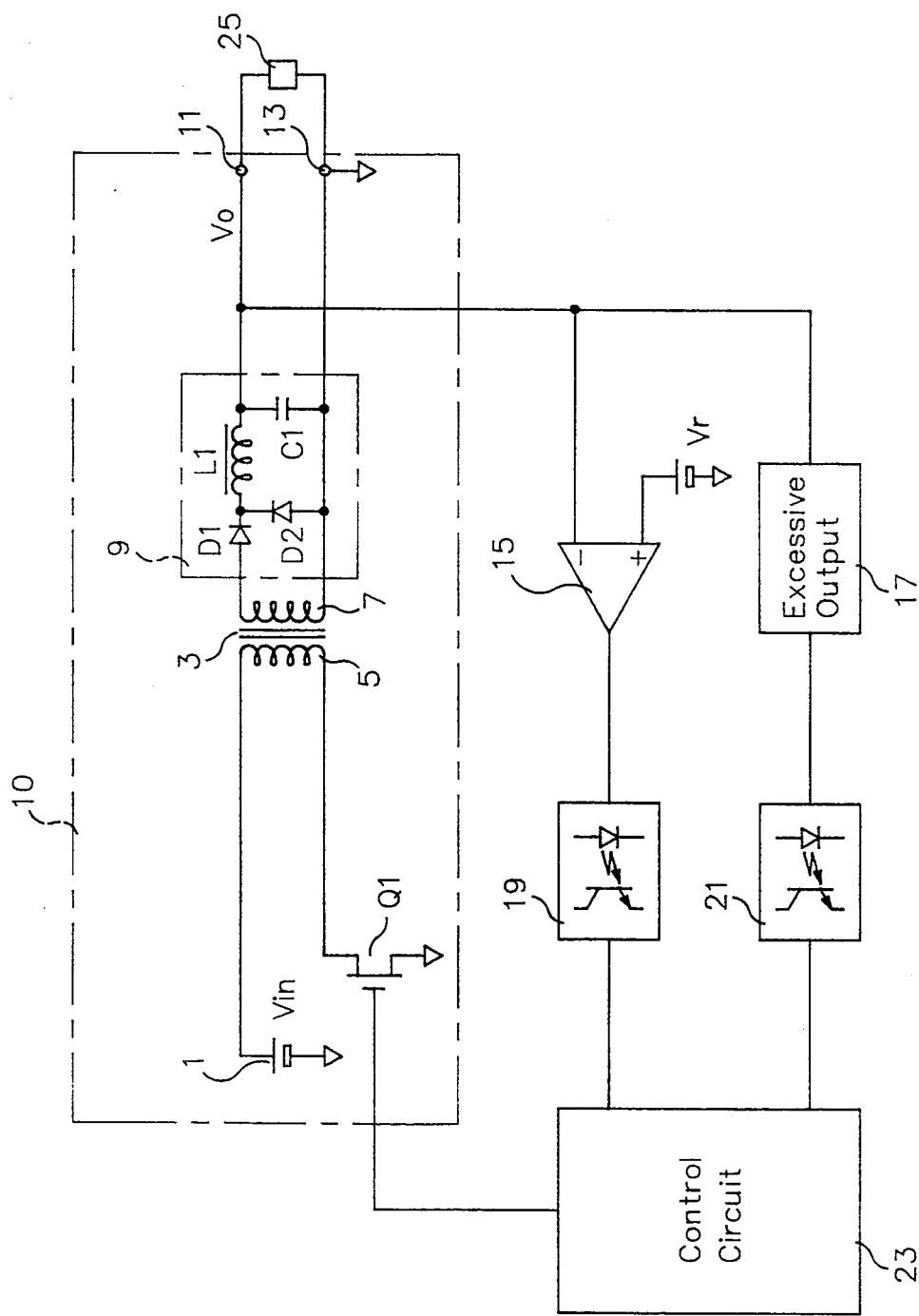
FIG. 1 is a circuit diagram depicting a convertional switching power supply.
Figure 2:
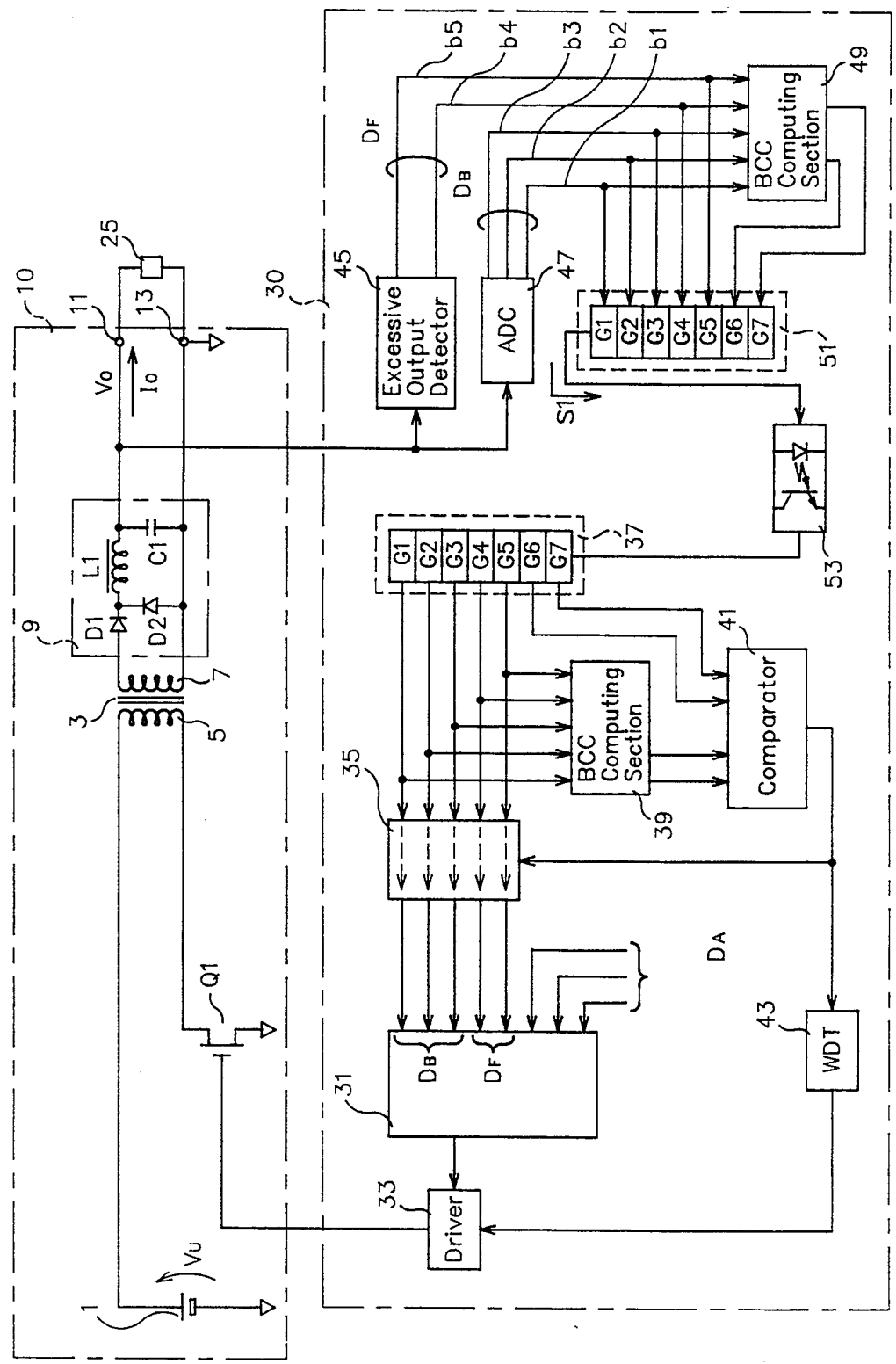
FIG. 2 is a circuit diagram depicting an illustrative embodiment of the invention.
Figure 3:
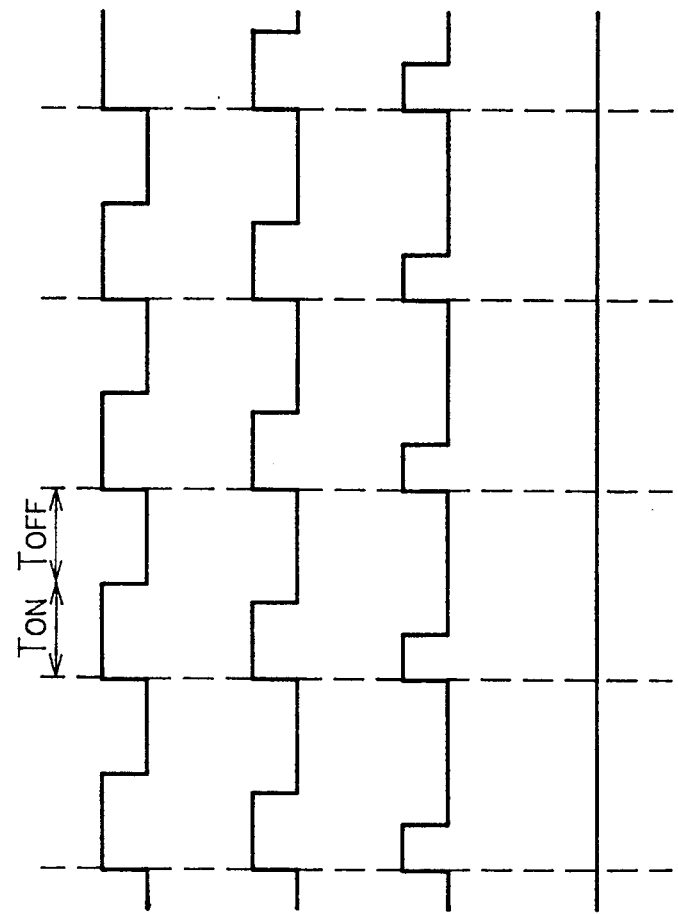
FIGS. 3(A)–3(D) are waveform diagrams depicting pulse width modulated signals outputted by feedback arithmetic unit 31 of the embodiment of FIG. 2.

In FIG. 2 which depicts the first illustrative embodiment, a DC converting circuit 10 is depicted which is the same as that shown in FIG. 1 so that no further discussion thereof is set forth hereat. A control circuit 30 provides feedback control and regulates DC output voltage $V_o$ from DC converting circuit 10, by controlling the ratio of conducting period $T_{ON}$ of switching device Q1 to the total period (i.e. conducting period $T_{ON}$ plus the non-conducting period $T_{OFF}$) that is the duty cycle given by $T_{ON}/(T_{ON}+T_{OFF})$ so that the DC output voltage $V_o$ assumes a predetermined value. Control circuit 30 comprises a feedback arithmetic unit 31 for regulating the output voltage, an excessive output detector 45 for detecting excessively large output and for providing data $D_F$ used in protecting the power supply against such excessively large output, a WDT (watch dog timer) 43, an ADC (analog-to-digital converter) 47 for converting an analog signal into digital form, an S/P (serial-to-parallel) converter 37 for providing isolation during digital processing, a photocoupler 53, and a P/S (parallel-to-serial) converter 51.

Feedback arithmetic unit 31 receives a digital signal via a register 35 and receives an output preset value $D_A$. The digital signal from register 35 is composed of a plurality of bits. Some of the bits indicate data $D_B$ about DC output voltage $V_o$. The remaining bits indicate a flag $D_F$ that indicates whether an excessively large output is detected or not detected. The ratio of the conducting period $T_{ON}$ of switching device Q1 to the total period $T_{ON}+T_{OFF}$, is calculated from data $D_B$, indicating the value of the DC output voltage $V_o$, so that voltage $V_o$ becomes equal to the value determined by the data $D_A$. Arithmetic unit 31 produces a pulse width modulated signal according to the obtained results.

FIGS. 3(A)–3(D) show pulse width modulated signals generated by feedback arithmetic unit 31, when the DC output voltage $V_o$ is 6 V, 4 V, 2.5 V, and 0 V, respectively. It can be seen that as the output voltage $V_o$ increases, the conducting period $T_{ON}$ of switching device Q1 increases.

Referring back to FIG. 2, to protect the apparatus from excessively large output voltage $V_0$, arithmetic unit 31 produces a signal which is applied to a driver 33 to turn OFF switching device Q1 when flag data $D_F$, which is contained in the input signal and indicates that the excessively large output voltage is present, i.e. assumes state 1, irrespective of the contents of data $D_B$ indicating the value of the output voltage $V_o$.

Driver 33 amplifies the pulse width modulated signal applied by arithmetic unit 31 and supplies the amplified signal to switching device Q1 to turn the device ON and OFF. When driver 33 receives a signal from WDT 43 indicating that a trouble exists, driver 33 turns OFF switching device Q1 irrespective of the contents of the signal from arithmetic unit 31.

Register 35 periodically receives the contents of the S/P converter 37, at the timing of output signal from a comparator 41, and routes such contents to feedback arithmetic unit 31.

S/P converter 37 is equipped with storage elements G1–G7. The states (each being 0 or 1) of pulses serially applied by photocoupler 53 are successively accepted in storage elements G1–G7. For example, the contents of storage elements G1–G5 are applied to register 35 as parallel signals. Thus, the introduced serial signal S1 is converted into parallel form. Data accepted in storage elements G6 and G7 are called "block check codes" (BCC) and sent to comparator 41, where the codes are used to demonstrate the validity of the transmission of data.

A BCC (Block Check Code) computing section 39 receives data from S/P converter 37 for activating switching device Q1 and performs parity check and cyclic redundancy check (CRC) on the data to determine whether the data has been transmitted correctly. In this example, the data stored in storage elements G1–G5, i.e. data $D_B$ indicating the value of output voltage $V_o$, and the flag data $D_F$ indicating the presence or absence of detection of an excessively large output voltage $V_o$, are supplied to BCC computing section 39.

Comparator 41 compares the value calculated by BCC computing section 39 (which is a circuit element located on the primary side) with the value calculated by BCC computing section 49 (which is a circuit element located on the secondary side), the latter value being introduced ultimately via storage elements G6 and G7 of S/P converter 37. The obtained signal is applied to register 35 and to WDT 43. If the values calculated respectively by BCC computing sections 39 and 49 are equal, then the transmission from the secondary side to the primary side contains no error. If they are not equal, on the other hand, then transmission contains error.

WDT 43 produces a warning signal when a signal indicating normal conditions is not applied during a given period. In this example, the warning signal indicating an abnormality, is applied to driver 33.

Excessive output detector 45 monitors the amplitudes of output voltage $V_o$ and output current $I_o$ at output terminals 11, 13. If either an overvoltage or an overcurrent, exceeding a present value, is detected, detector 45 produces a flag data $D_F$ indicating the overvoltage or overcurrent. Flag data $D_F$ comprises two bits of information b4 and b5. For example, they are 0's under normal condition. If an overvoltage occurs, flag signal bit b4 is set to 1. If an overcurrent occurs, flag signal bit b5 is set to 1. If other information to be transmitted to the primary side is present, the number of bits may be increased.

ADC 47 converts DC output voltage $V_o$ into digital form. In the embodiment, the converted bits are three bits, b1, b2, b3. Data $D_B$ outputted from the ADC 47, indicates the value of DC output voltage $V_o$. Preferably the number of converted bits is determined by equation (3) described hereinbelow.

BCC computing section 49 operates in a manner similar to the BCC computing section 39. In particular BCC computing section 49 receives from ADC 47, data $D_B$, indicating the value of output voltage $V_o$, and from excessive output detector 45 flag data $D_F$, indicating the presence or absence of an excessively large output $V_o$. BCC computing section 49 performs a parity check and other operations on the five bits (b1–b5) of data and produces one or more output signals. In the embodiment, the output signals from BCC computing sections 39 and 49 are two bit signals. The output signals from sections 39 and 49 may comprise an arbitrary number of bits as long as they can prove the validity of the transmission of data.

The P/S converter 51 is equipped with storage elements G1–G7 and receives from ADC 47 data $D_B$ indicating the value of output voltage $V_o$, and from detector 45, flag data $D_F$ indicating the presence or absence of an excessively large output $V_o$, and from BCC computing section 49 output signals. The signals are stored in storage elements G1–G7. The contents of the storage elements G1–G7 are serially outputted at the timing of an applied clock signal (from a source not shown). P/S converter 51 varies the level of output signal S1 according to the output data. For example, if the output data is 1, signal S1 is made to take a high level. If the output data is 0, signal S1 is made to take a low level. In this manner, parallel data which are stored in storage elements G1–G7 are converted into a serial pulse train signal S1 by P/S converter 51.

Isolating device 53, which comprises a photocoupler, a transformer, or the like, transmits a signal from the secondary side to the primary side while concurrently electrically isolating the two sides from each other. Isolating device 53 is disposed between P/S converter 51 and S/P converter 37. In the embodiment, if the number of different types of information transmitted from the secondary side to the primary side increases, advantageously, it is not necessary to provide more than the one isolating device 53.

Operation of the embodiment is as follows. In FIG. 2, the value of voltage $V_o$, appearing across terminals 11, 13, is determined by signal $D_A$, applied to arithmetic unit 31 to set the value of the output voltage $V_o$.

It is assumed that the output preset value $D_A$ is set to be equal to $D_{6V}$ which will result in an output voltage of 6 volts. $D_{6V}$ is represented in terms of 110 in binary representation. Switching device Q1 is turned ON and OFF according to the pulse width modulated signal outputted by arithmetic unit 31. As a result, a voltage is induced across secondary winding 7. The induced voltage is converted into voltage $V_o$ by rectifying-smoothing circuit 9. It is assumed that voltage $V_o$ is equal to 5 volts. The value of voltage $V_o$ is converted into digital form by ADC 47, and the value is outputted as digital data $D_B$ (e.g. 101) indicating 5 volts. Digital data $D_B$ is represented by a three bit signal (b1=1, b2=0, and b3=1) in FIG. 2. As a result, 1, 0, and 1 are stored in storage elements G1, G2 and G3, respectively of P/S converter 51.

It is assumed that neither overvoltage nor overcurrent is produced across terminals 11, 13. Flag data $D_F$, from excessive output detector 45, produces a flag signal b4=0 (meaning that no overvoltage exists) and a flag signal b5=0 (meaning that no overcurrent exists). Consequently, 0's are stored in storage elements G4 and G5 of P/S converter 51.

BCC computing section 49 cooperates with BCC computing section 39. The values of the block check codes calculated by the BCC computing sections 39, and 49, are compared with each other by comparator 41 to determine whether the data has been transmitted correctly from the secondary side to the primary side. A specific example of calculation performed by BCC computing section 49 is as follows. BCC computing section 49 is capable of calculation a function f (b1, b2, b3, b4, and b5) for calculation of parity checks. The values of b1–b5, introduced from ADC 47 and from excessive output detector 45, are substituted into the function. Thus, a desired BCC value is derived. In the embodiment, b1=1, b2=0, b3=1, b4=0, and b5=0, were substituted into the function f, and calculations were performed. The following BCC value was obtained:

$$f(b1, b2, b3, b4, b5) = 01 \tag{1}$$

This BCC value is determined by the data about b1, b2, b3, b4 and b5, and is stored in the storage elements G6 and G7 of P/S converter 51.

Figure 4:
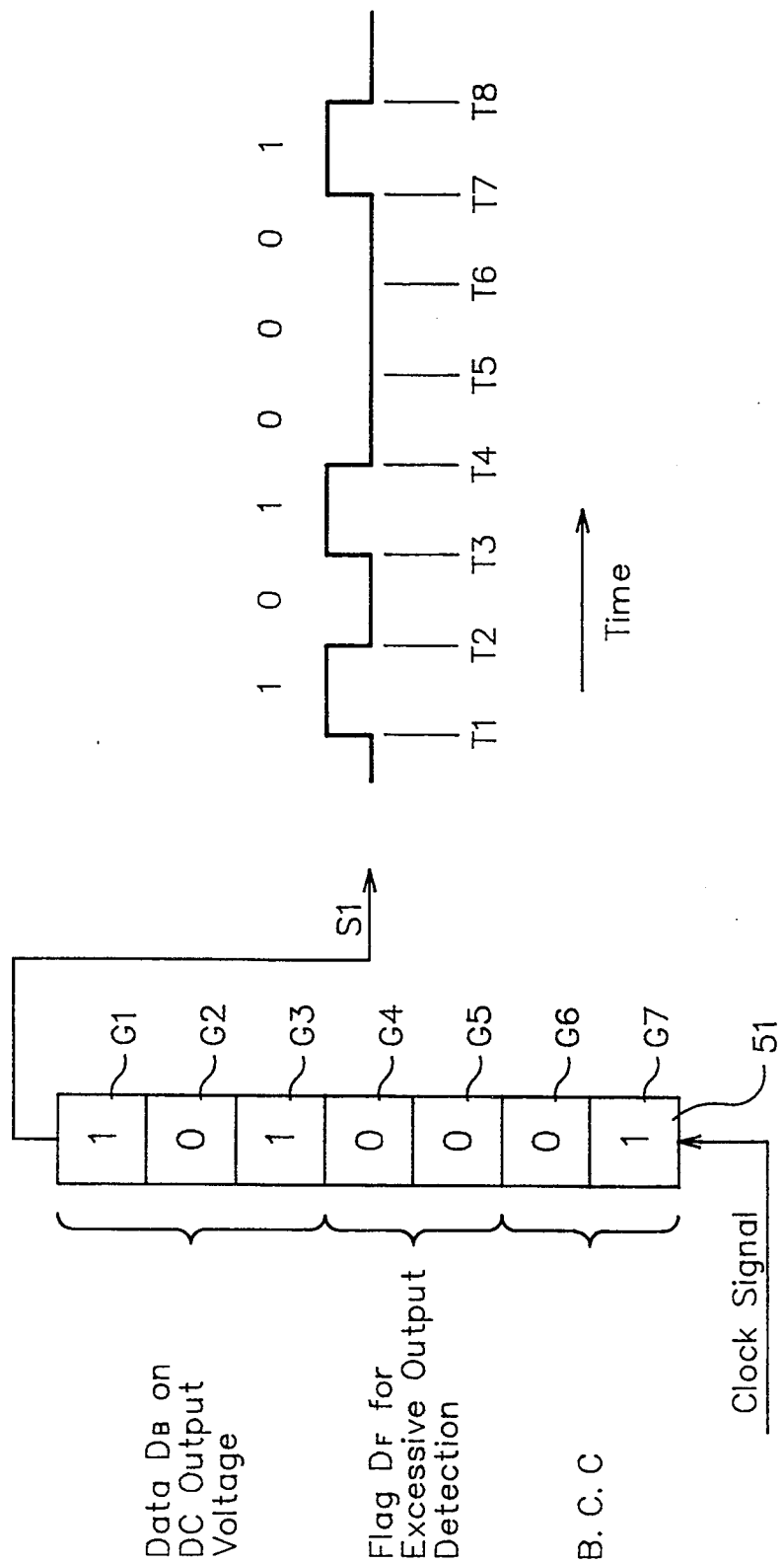
FIG. 4 is a diagram depicting data stored in the P/S converter 51 shown in FIG. 2 and the transmitted waveforms.

FIG. 4 is a diagram illustrating data stored in P/S converter 51, and the transmitted waveforms. Since $B_B=101$, $D_F=00$ and BCC value=01, as mentioned above, the illustrated data (1010001) is stored in the storage elements G1–G7 of P/S converter 51. A clock signal (from a source not shown) is applied to P/S converter 51. Whenever the clock signal is applied, the contents of storage elements G1–G7 are successively outputted as though they are pushed out. For example, if the clock signal is applied at instant T1, the contents "1" of storage element G1 are outputted. Thus, output signal S1 from P/S converter 51 assumes a high level. At instant T2, the contents "0" of storage element G2 are pushed out, so that the signal S1 assumes a low level. Similarly, whenever the clock signal is applied to P/S converter 51 at subsequent instants of time T3, T4, T5, etc, the contents of storage elements G3, G4, G5, etc, are successively outputted. Hence, signal S1 assumes the form of a serial pulse train, such as that shown. That is, parallel data stored in storage elements G1–G7 are converted into serial form by P/S converter 51.

Figure 5:
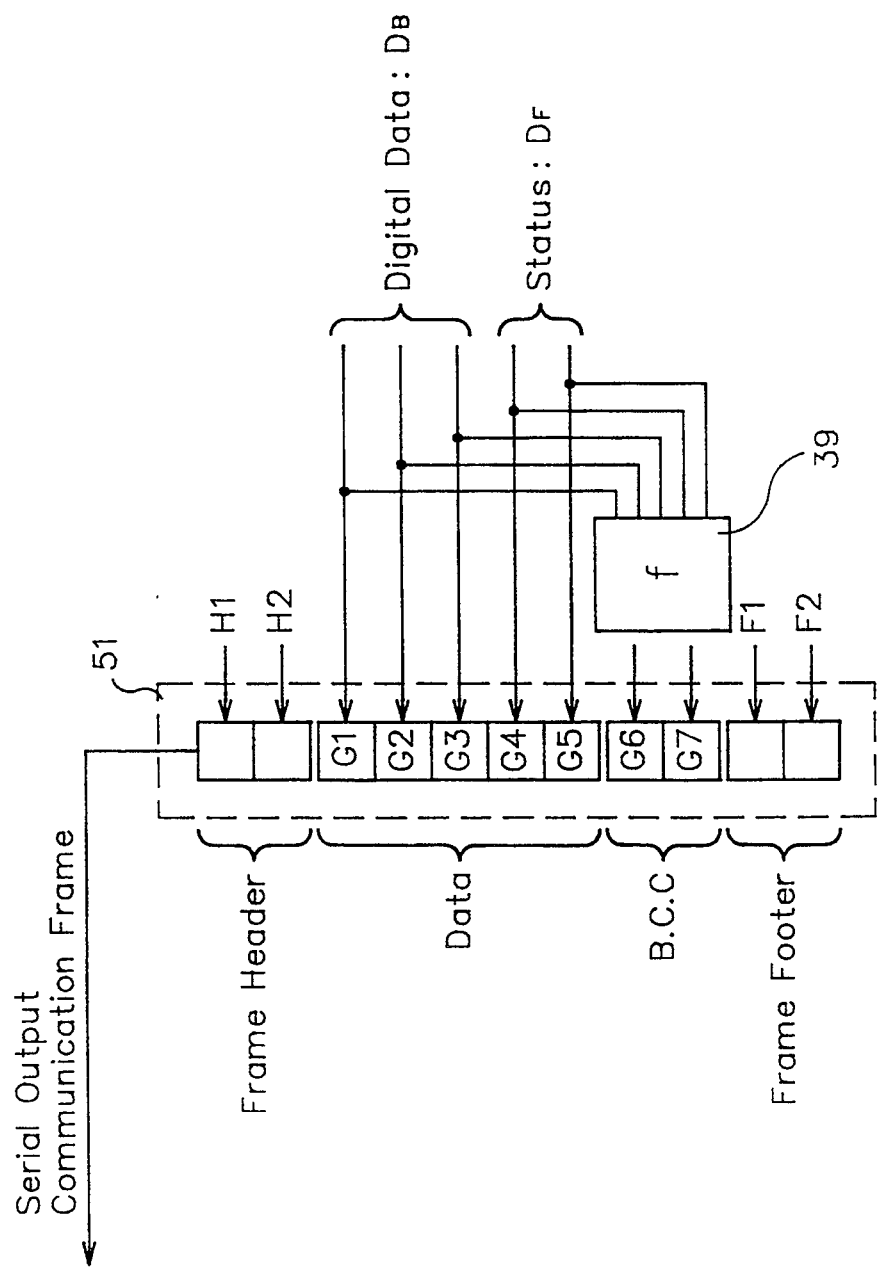
FIG. 5 is a diagram depicting the manner in which a communication frame is formed by the P/S converter 51 of FIG. 2.

FIG. 5 shows the manner in which a communication frame is formed by P/S converter 51. In forming the communication frame, two bits of frame headers $H_1$ and $H_2$ are attached to the front end of the contents of the storage elements G1–G7 of P/S converter 51. Two bits of frame footers $F_1$ and $F_2$ are attached to the rear end.

Figure 6:
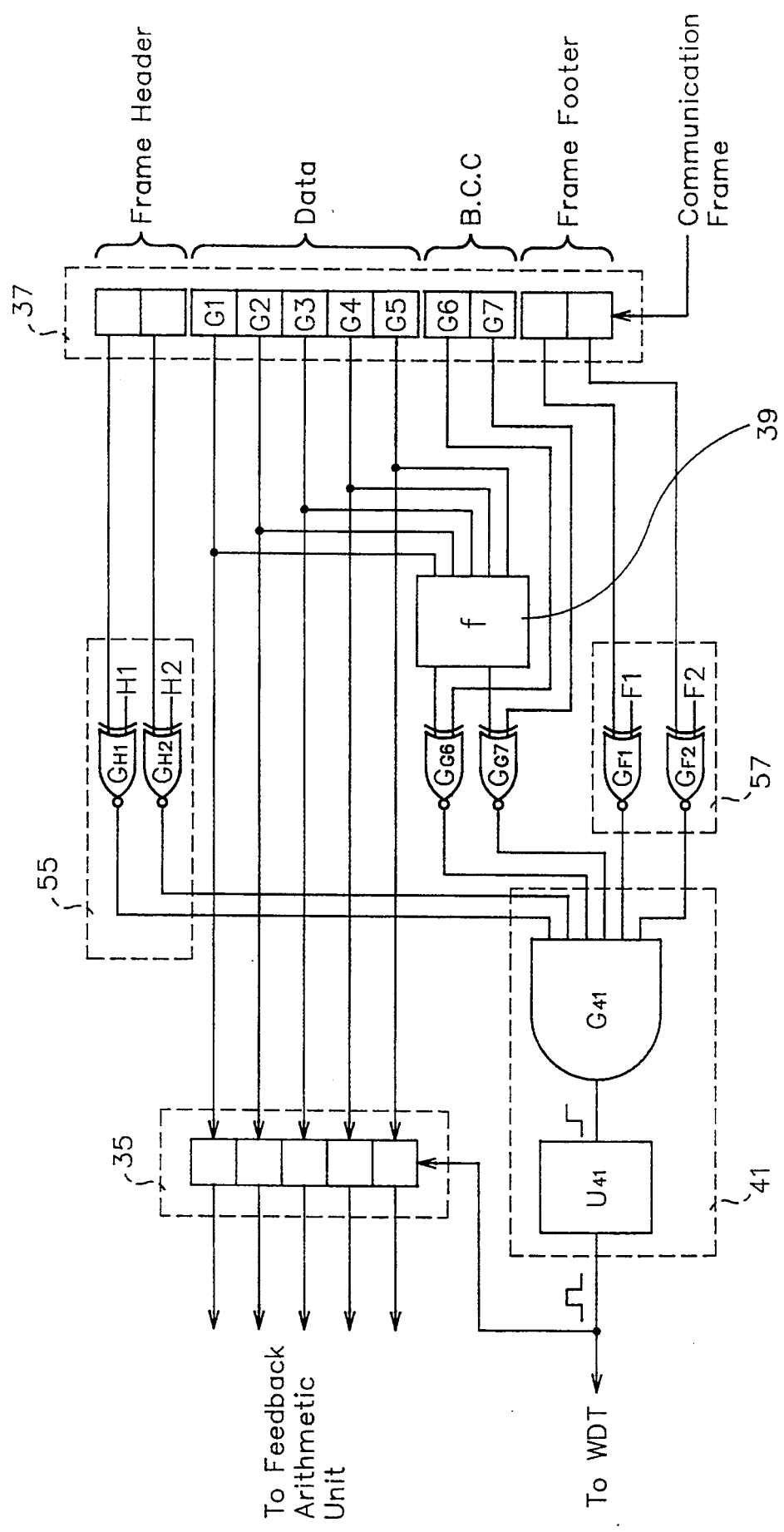
FIG. 6 is a diagram depicting the manner in which a communication frame is extracted by the S/P converter 37 of FIG. 2.

FIG. 6 shows the manner in which S/P converter 37 extracts a communication frame. Converter 37 transmits the contents of the pulse train signal S1 applied by photocoupler 53 to storage elements G7, G6, G5, etc, in that order and finally to storage element G1, in a manner similar to a shift register. For example, signal "1" applied to S/P converter 37 at instant T1, shown in FIG. 4, is sent to storage elements G6, G5, etc of S/P converter 37 in response to a clock signal (from a source not shown) applied at subsequent instants of time T2, T3, etc. At instant of time T7, the signal is stored in storage element G1. That is, a parallel signal, e.g. 1010001, having the same bit structure as P/S converter 51 is transmitted to the storage elements G1–G7 of S/P converter 37.

A communication frame is formed in the embodiment, wherein two bits of frame headers $H_1$ and $H_2$ are attached to the front end, and two bits of frame footers $F_1$ and $F_2$ are attached to the rear end. A frame detector 55 receives bits corresponding to the frame headers of S/P converter 37. Reference signals $H_1$, $H_2$ become the frame headers $H_1$ and $H_2$ to logic elements $G_{H1}$ and $G_{H2}$. The headers are previously determined by communication rules. The logic elements $G_{H1}$ and $G_{H2}$ are exclusive NOR gates which are also known as equivalence gates. The output of each exclusive NOR gate is the logic 0 (false) only when any one of the inputs thereof is the logic 1 (true) and all the others are the logic 0, otherwise the output is the logic 1. A frame detector receives bits corresponding to the frame footers of S/P converter 37. Reference signals $F_1$, $F_2$ become the frame headers $F_1$ and $F_2$ to logic elements $G_{F1}$ and $G_{F2}$. Frame headers $F_1$ and $F_2$ are previously determined by communication rules. The logic elements $G_{F1}$ and $G_{F2}$ are exclusive NOR gates.

The output from frame detector 55 and the output from frame detector 57 are fed to an AND gate $G_{41}$, included in comparator 41, which acts to recognize the communication frame. BCC computing section 39 is capable of calculating a function f (b1, b2, b3, b4, and b5) in the same manner as the BCC computing section 49, described above. The values of storage elements G1–G5 introduced from S/P converter 37 are substituted into this function. If the transmission of information from the secondary side to the primary side involves no error, the value of BCC computing section 39 on the primary side is the same as the BCC value of BCC computing section 49 on the secondary side. In the embodiment, logic elements $G_{G6}$ and $G_{G7}$ compare the BCC values (b6, b7) calculated by BCC computing section 39 with the BCC values (G6, G7) which are calculated by BCC computing section 49 and stored in S/P converter 37 to prove their equality.

The results of exclusive NOR operations performed by the logic elements $G_{G6}$ and $G_{G7}$ are applied to AND gate $G_{41}$ of comparator 41. If they are equal, it follows that the communication was conducted normally. Then, a one shot circuit $U_{41}$ produces a pulse signal which is supplied to register 35 and to WDT 43. Register 35 receives this signal from comparator 41 and supplies data stored in storage elements G1–G5 of S/P converter 37 to arithmetic unit 31. If comparator 41 cannot confirm that the communication is normal, then WDT 43 runs out, thereby informing the driver 33, etc, that an abnormality has occurred.

In this way, data $D_B=101$ (5 volts) indicating the value of output voltage $V_o$ is fed back to arithmetic unit 31. On the other the output preset value is $D_A=110$ (6 volts). Thus, to find the error voltage, arithmetic unit 31 performs the following calculation:

$$\Delta D = D_A - D_B \tag{2}$$

That ratio of non-conducting period to total period (i.e. $T_{ON}/(T_{ON}+T_{OFF})$) at which error voltage $\Delta D$ is zero is calculated by PID (Proportional-Integral-Derivative) control. The resulting pulse width modulated signal is applied to driver 33. In this case, the actual DC output voltage $V_o$ (=5 volts) is still lower than the preset value of 6 volts. Thus, a pulse width modulated signal in which the ratio of the $T_{ON}$ has been increased is generated. By control provided by the feedback loop for stabilizing the output voltage and by feedback arithmetic unit 31, data $D_B$ indicating the value of voltage $V_o$ fed back via register 35 reaches value 110 (6 volts). That is, voltage $V_o$ agrees with the output preset value $D_A$=110 (6 volts). Consequently, the control system is stabilized.

If voltage $V_o$ or output current $I_o$ at output terminal 11 increases excessively for any reason, and if such voltage or current exceeds the upper limit of the voltage or current of detector 45, then detector 45 sets at least one of the two flag data $D_F$ to 1. Flag data $D_F$ is supplied to arithmetic unit 31 via the route described above. When at least one of flag data $D_F$ is set to 1, arithmetic unit 31 recognizes that an excessively large output exists. Unit 31 immediately produces a signal to turn OFF device Q1. Hence, voltage $V_o$ is reduced down to 0 volt. Accordingly, load 25 is protected from destruction by such excess voltage or current.

If data or information transmitted from P/S converter 51 via photocoupler 53 is not correctly routed to S/P converter 37 for some reason, then the BCC value of BCC computing section 49 is different from the BCC value of BCC computing section 39. The comparator 41 detects this disagreement and stops the transmission of signals indicating that transmission is normal. As a result, the signal indicating that transmission is normal is no longer applied to WDT 43. Hence, WDT 43 transmits a warning signal to driver 33 and turns OFF switching device Q1. In this manner, if the switching power supply would otherwise be controlled according to data incorrectly transmitted, the output voltage $V_o$ is prevented from assuming an abnormal value.

Figure 7:
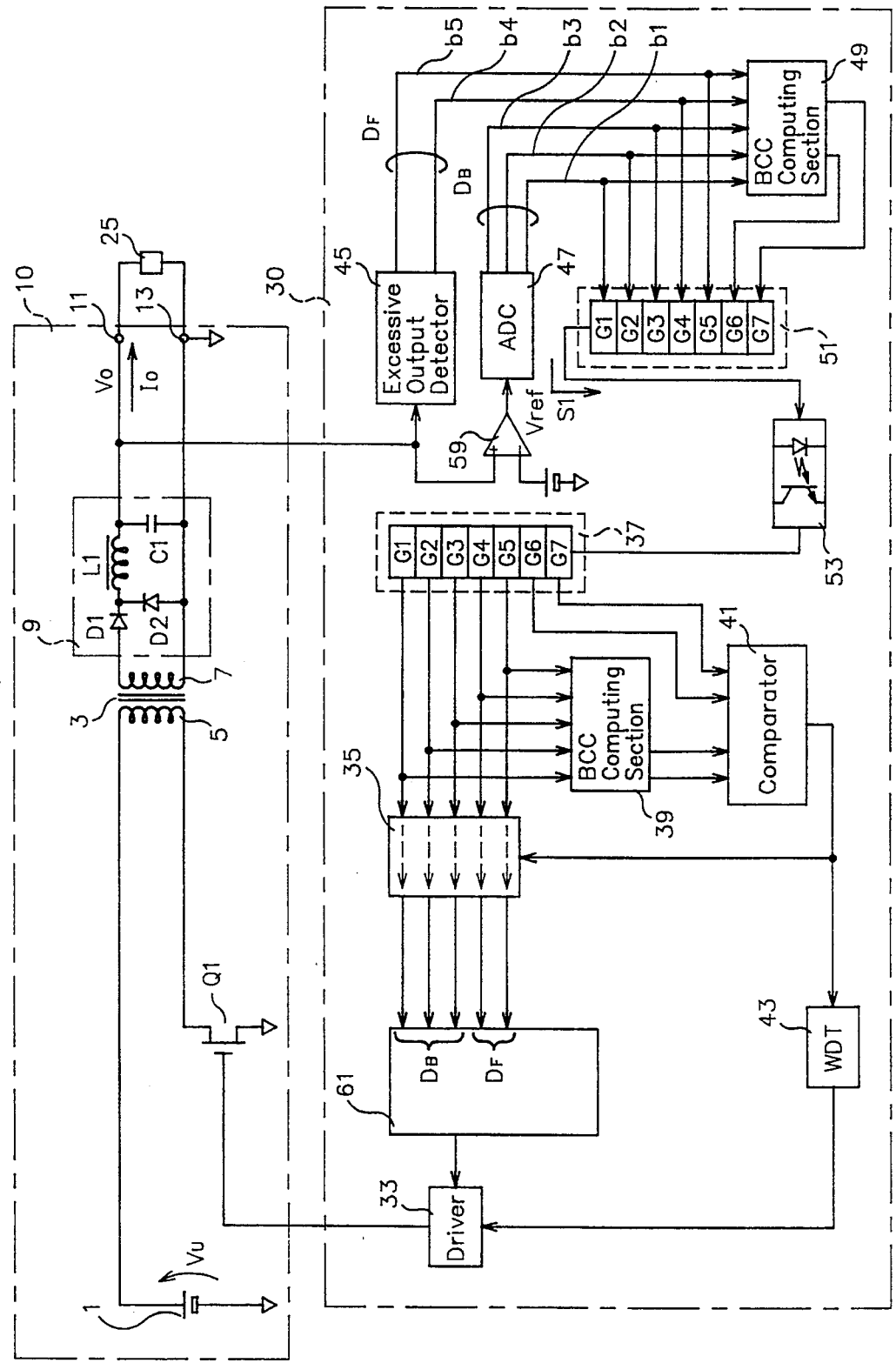
FIG. 7 is a circuit diagram depicting a second illustrative embodiment of the invention.

FIG. 7 depicts a second embodiment of the invention which differs from the firs embodiment in the presence of a differential amplifier 59 and in the use of a different feedback arithmetic unit 61. Differential amplifier 59 compares voltage $V_o$ with an output preset voltage $V_{ref}$ and produces an error voltage which is supplied to ADC 47. ADC 47 converts the error voltage from differential amplifier 59 into digital data $D_B$ which is applied to feedback arithmetic unit 61 via P/S converter 51, photocoupler 53, S/P converter 37, and register 35. Since amplifier 59 functions to produce a substantially similar result, arithmetic unit 61 dispenses with the output preset value $D_A$ which would otherwise be needed in arithmetic unit 31 (as in FIG. 2). Arithmetic unit 61 operates in such a manner that it produces a pulse width modulated signal so that the value of digital data $D_B$, which is fed back, assumes value 0.

Figure 8:
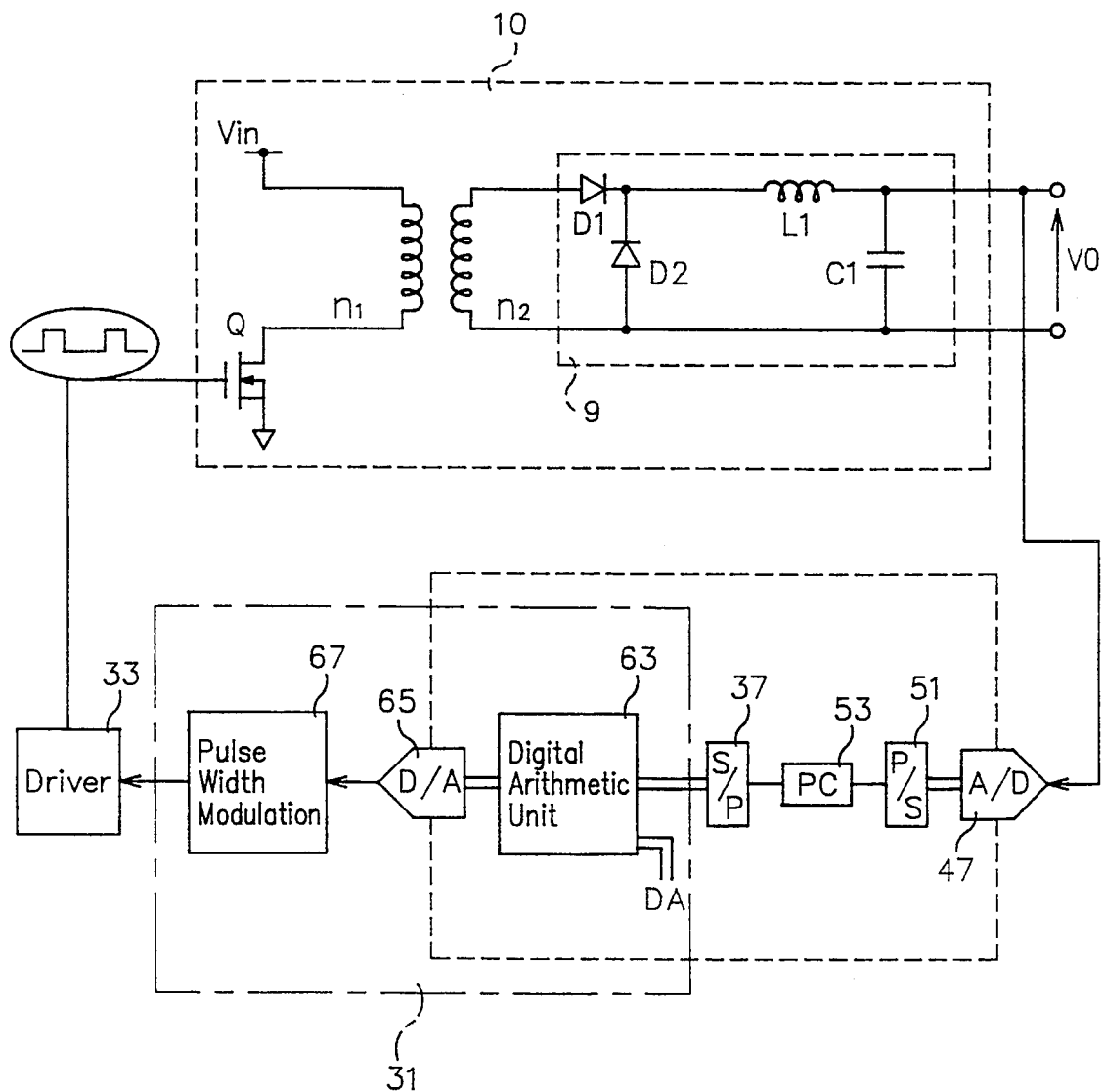
FIG. 8 is a circuit diagram depicting a known switching power supply wherein an analog voltage is applied to a pulse width modulation circuit.

FIG. 8 shows details of the feedback arithmetic unit, wherein an analog voltage is applied to a pulse width modulation circuit, such as in the prior art, and wherein only those portions of the circuit of FIG. 2 as needed for description are shown. Feedback arithmetic unit 31 comprises an arithmetic unit 63, a DAC (digital-to-analog converter) 65, and a pulse width modulation circuit 67. Circuits which treat digital signals are an ADC 47, a P/S converter 51, a photocoupler 53, an S/P converter 37, an arithmetic unit 63, and a DAC 65. A micro-processor can be used as arithmetic unit 63 to perform digital processing. Voltage $V_o$ is digitalized by ADC and transmitted. Arithmetic unit 63 compares output voltage $V_o$ fed back with the preset value $D_A$ and performs PID control. The control output from arithmetic unit 63 is converted into an analog form by DAC (incidently this is also referred to as D/A converter, and the term ADC is also referred to as A/D converter) 65. The analog output signal from DAC 65 is supplied to pulse width modulation circuit 67.

Figure 9:
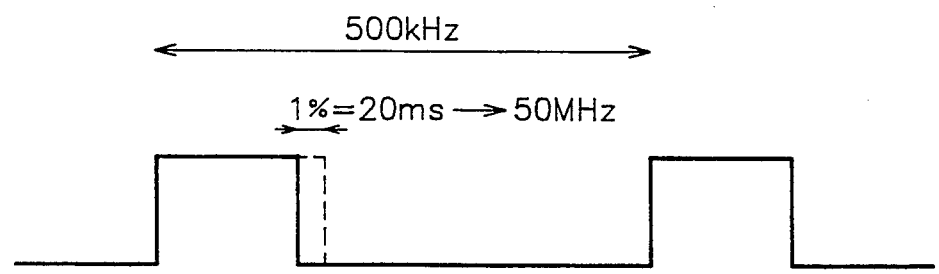
FIG. 9 is a waveform diagram depicting a switching control signal.

In FIG. 8, a digital circuit cannot be used as the pulse width modulation circuit 67 for the reasons explained hereinbelow in connection with FIG. 9, which is a waveform diagram of a switching control signal. Generally, as the switching frequency becomes higher, miniaturization of the transformer and smoothing circuit can be attained. Thus, the fundamental switching frequency of a pulse width modulation circuit is several hundreds of kiloherz. Where the output voltage $V_o$ is stabilized, with high accuracy, by the use of pulse width modulation, a high level of time resolution is needed. For example, let us assume that the switching frequency is 500 kHz, and the output resolution is 1%. A time resolution corresponding to 50 MHz (20 ns) is needed for pulse width modulation control. This increases the cost of the pulse width modulation control circuit. Such expensive circuit cannot be used in commercial applications, such as in commercial switching power supplies, which must be manufactured economically. Thus, usually analog circuits are used conventionally.

However, if an analog circuit is used in the pulse width modulation control circuit, DAC 65 must be inserted between unit 63 and pulse width modulation circuit 67, as shown in FIG. 8. This increases the cost of the parts. Since PWM (pulse width modulation) circuit 67 essentially treats digital signals, conversion into analog form by DAC 65 makes the signal processing redundant and increases cost of processing. This example, offers a switching power supply which adopts a pulse width control system to process digital signals which produce high resolution with need of high level of time resolution.

Figure 10:
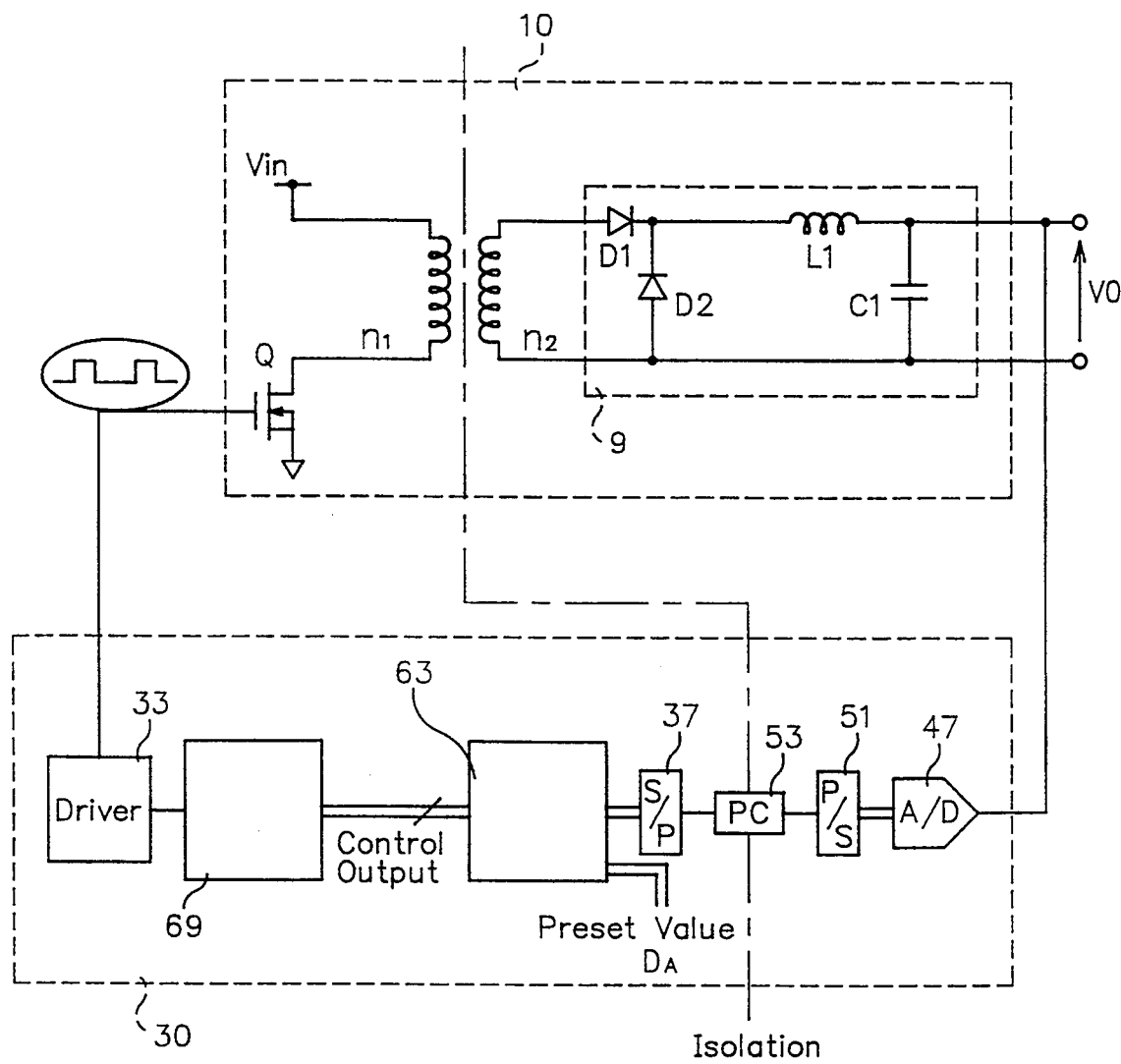
FIG. 10 is a block diagram depicting a third illustrative embodiment of the invention.

FIG. 10 shows a third embodiment wherein the deficiencies of the circuit of FIG. 8 are overcome. It is to be noted that like components are indicated by like reference symbols in the various figures and that those components which have already been described will not be further described hereat. A control circuit 30 comprises ADC 47, P/S converter 51, photocoupler 53, S/P converter 37, digital arithmetic unit 63, and digital modulator 69. ADC 47 digitalizes output voltage $V_o$ from DC converting circuit 10 into n-bit data. The bit width n inside control circuit 30 is uniquely determined by the required output resolution. For example, let the output resolution be 1%. The bit width n should be selected to be a natural number which is equal to 7 or more because of the following relationship:

$$\frac{1}{2}^n < 1/100 \qquad (3).$$

P/S converter 51, photocoupler 53, and S/P converter 37 may add status signals, such as the excessive output detection flag, BCC signals for proving the validity of the communication, the frame headers, and the frame footers for forming the communication frame, as already described in FIG. 2, in addition to the n-bit data. Digital arithmetic unit 63 compares output data from ADC 47 with a preset value $D_A$; performs PID control or calculations for fuzzy control; and produces an n-bit control output. Digital modulator 69 receives the control output and produces a 1-bit pulse train signal to turn ON and OFF switching device Q1. For example, modulator 69 compares a delta sigma modulator.

Figure 11:
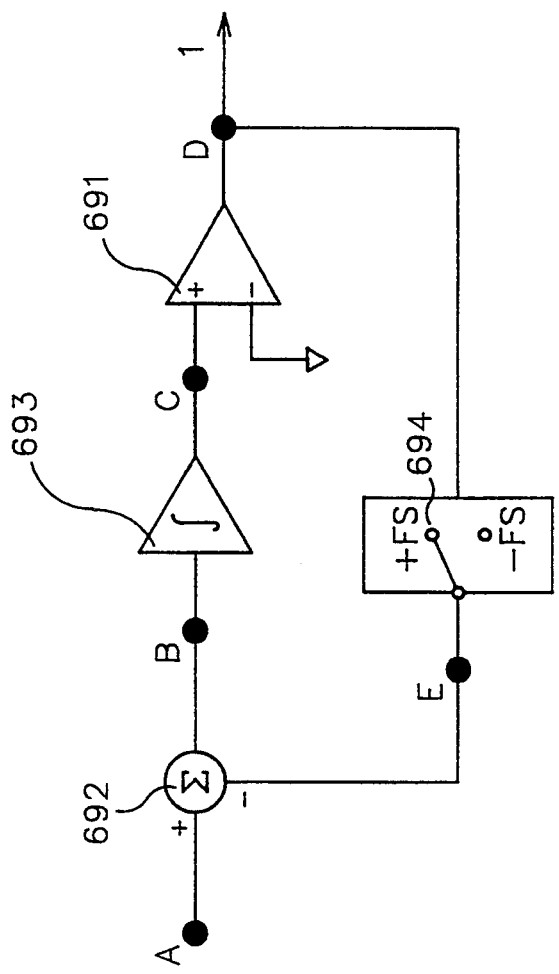
FIG. 11 is a block diagram depicting a delta sigma converter.

FIG. 11 shows a delta sigma modulator, wherein the reference time at which a comparator 691 performs a sampling operation is determined by a clock signal (from a source not shown) applied from the outside. Whenever a clock pulse arrives, comparator 691 performs a comparison operation. The output signal C from an integrator 693 is applied to the positive terminal of comparator 691, while the negative terminal is connected to a common terminal. Comparator 691 produces a switching control signal of a 1-bit pulse train at its output terminal D. A switch 694 produces a two valued signal E according to output signal D from comparator 691. Signal E takes either +FS (1) or −FS(0). Control output A is applied to the positive terminal of an adding-subtracting unit 692. Output signal E from switch 694 is applied to the negative terminal of adding-subtracting unit 692, which produces sum B of two signals (A and E) and applies sum B to integrator 693. Integrator 693 adds signal B sent from unit 692 in response to the present clock pulse to the result obtained in response to the previous clock pulse, and outputs signal C which is applied to comparator 691.

The transfer function of the delta sigma modulator of FIG. 11 is given by the following:

$$Y(z) = X(z) + (1-z^{-1})^n Q(z) \quad (4)$$

wherein $X(z)$ is an input signal, and $Y(z)$ is an output signal. $Q(z)$ is introduced by regarding the characteristic of comparator 691 which is a non-linear element, such as noise, produced by quantization of the signal. Indicated by n is the order of integrator 693 and is a natural number equal to or greater than unity.

Figure 12:
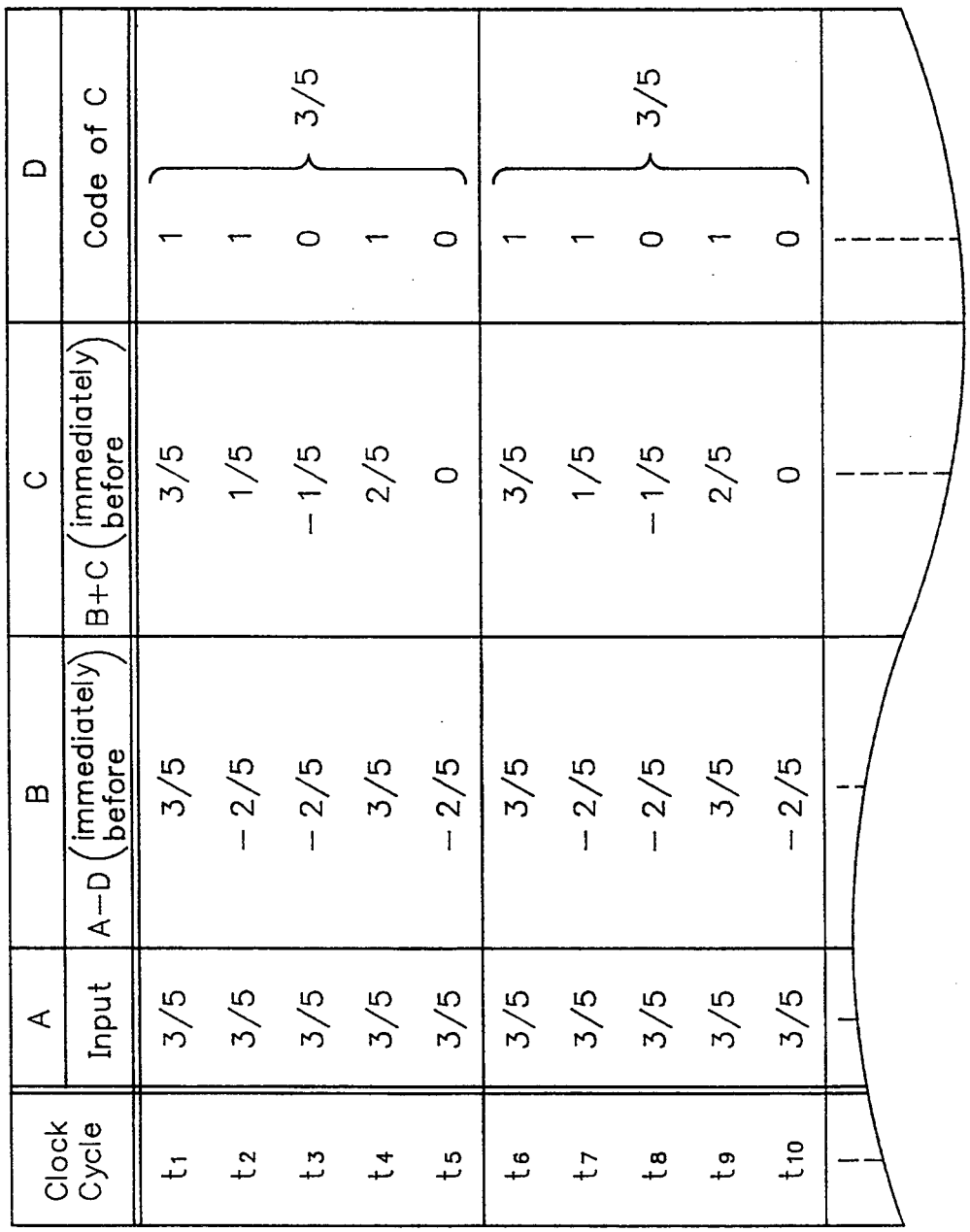
FIG. 12 is a table depicting operation of the circuit of FIG. 11.

The operation of the embodiment of FIG. 11 is described with reference to FIG. 12. In the table of FIG. 12, the first column indicates clock cycles $t_1$-$t_{10}$. The second column indicates signal A1 which is the control output preset value x. The third column indicates signal B which is the difference between signal A and signal D produced immediately before. The fourth column indicates signal C which is the sum of signal B and signal C produced immediately before. The fifth column indicates signal D which is the sign of signal C.

Clock cycle $t_1$ is the first cycle. A control output (3/5 in the example) is furnished as signal A to adding-subtracting unit 692 and signal B becomes 3/5. Signal A is fed to integrator 693. Signal C from integrator 693 becomes 3/5. In response, signal D from comparator 691, which indicates the result of the comparison, assumes a value of 1.

On the next clock cycle $t_2$, the control output (3/5 in the example) is supplied as signal A to adding-subtracting unit 692, which produces the sum of signal A and signal D fed back to unit 692 at clock cycle $t_1$. Signal B becomes −2/5 and is applied to integrator 693. Signal B is added to the previous signal of 3/5. Then, signal C becomes 1/5. In response, signal D from comparator 691, which indicates the result of the comparison, becomes 1. The series of operations is continued between clock cycle $t_1$ and clock cycle $t_5$. As a result, the average value of signal D over the 5 clock cycles is equal to the control output value. At clock cycle $t_6$, the condition returns to the condition of first clock cycle $t_1$.

Figure 13:
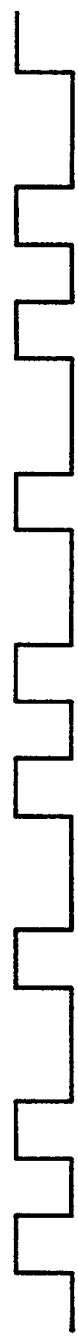
FIG. 13(A) and 13(B) are waveform diagrams depicting operation of the embodiment of FIG. 10.
Figure 13:
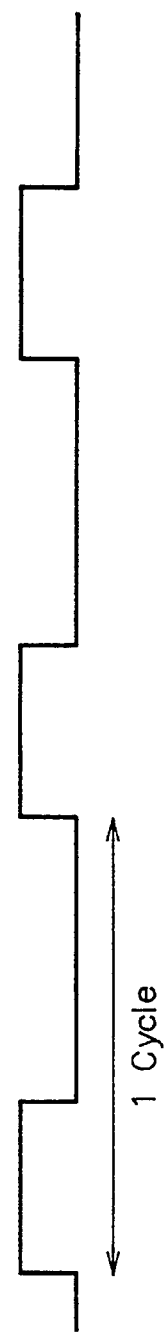
Figure 14:
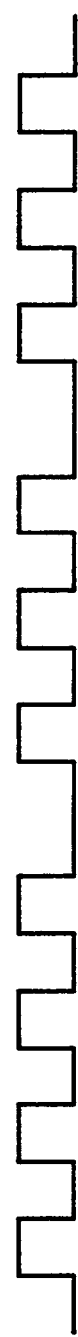
FIGS. 14(A) and 14(B) are waveform diagrams depicting operation of the embodiment of FIG. 10.
Figure 14:
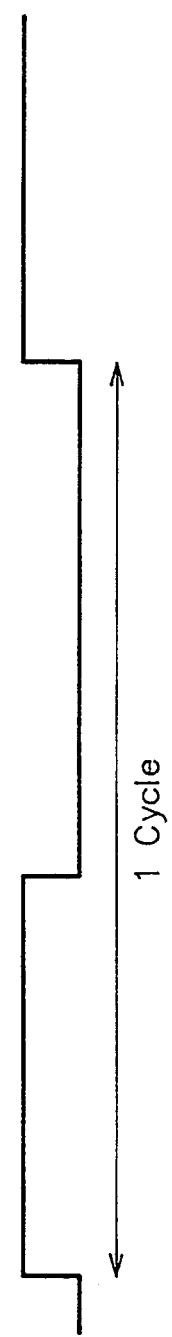

FIGS. 13(A) and 13(B) are waveforms illustrating the operation of the embodiment of FIG. 10, wherein FIG. 13(A) shows the case wherein an output signal is produced at a duty cycle of 3/8 and at an output resolution of 1/8; and FIG. 13(B) shows the case of the apparatus of FIG. 8, for comparison. FIGS. 14(A) and 14(B), are also waveforms illustrating the operation of the embodiment of FIG. 10, wherein FIG. 14(A) shows the case wherein an output signal is produced at a duty cycle of 7/16 and at an output resolution of 1/16; and FIG. 14(B) shows the case of the apparatus of FIG. 8, for comparison.

Where digital modulator 69 makes use of delta sigma modulation, the frequency components of the output signal from the modulator are not varied greatly even if the resolution is doubled. The frequency components vary according to the clock signal. In other words, any desired output resolution can be attained without lowering the effective frequency of the transformer or the output smoothing circuit, by changing the bit width n of control circuit 30. On the other hand, in the conventional apparatus utilizing a pulse width modulator, when the fundamental cycle of the modulator output increases from 8 to 16, the frequency components are substantially halved. In order to achieve miniaturization of the transformer and the output smoothing circuit without lowering the effective frequency of the transformer and the output smoothing circuit, the operation clock for the pulse width modulator is required to be doubled.

Figure 15:
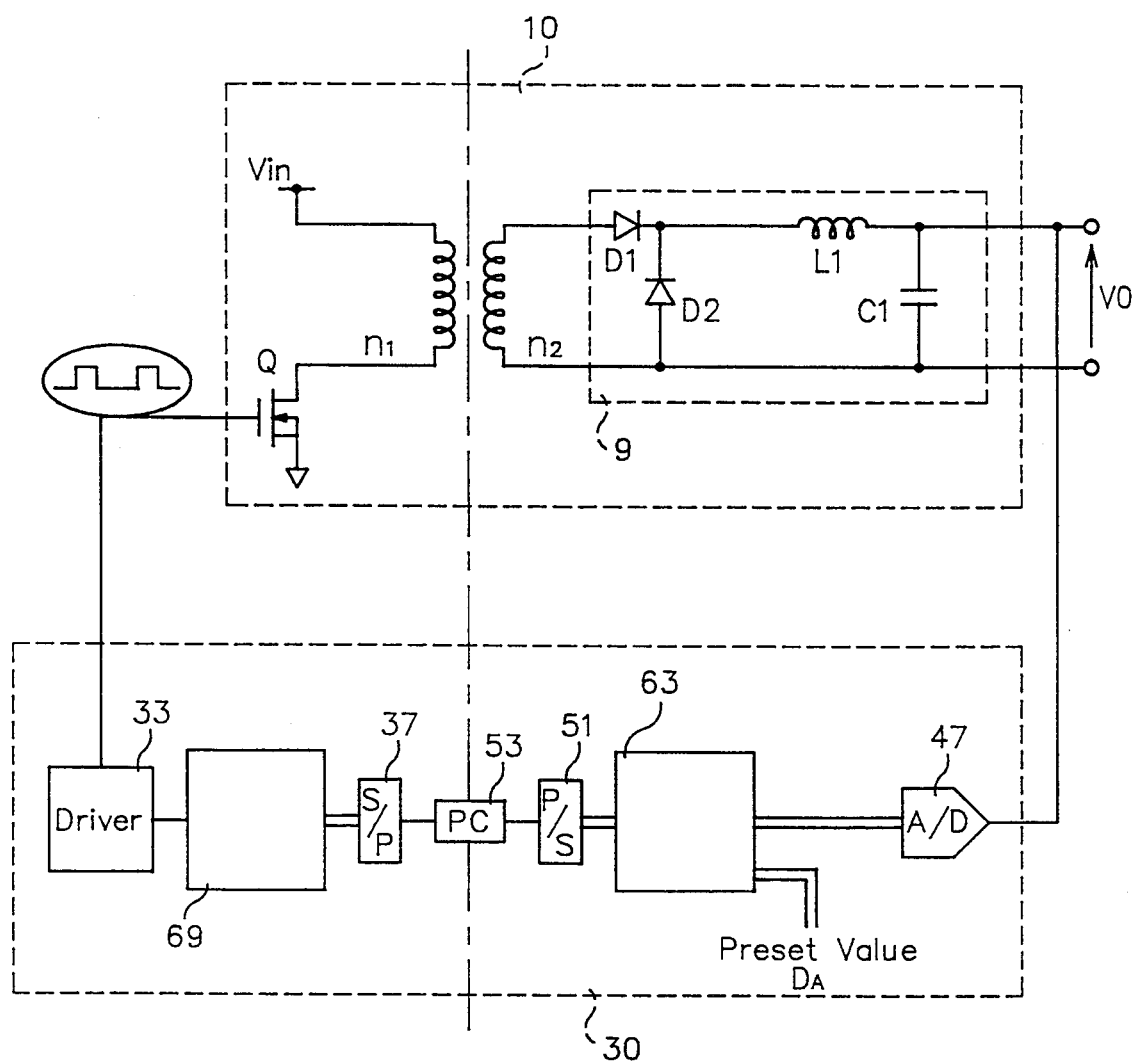
FIG. 15 is a circuit diagram depicting a fourth illustrative embodiment of the invention.

FIG. 15 shows a modified embodiment comprising P/S converter 51, photocoupler 53, and S/P converter 37 disposed between digital arithmetic unit 63 and a digital modulator 69. P/S converter 51 converts the n-bit control output from digital arithmetic unit 63 into serial data and forms an appropriate communication frame. The frame is transmitted serially. S/P converter 37 restores the incoming serial communication frame to the original n-bit width and supplies the converted signal to the digital modulator 69. Photocoupler 53 is connected between P/S converter 51 and S/P converter 37 and transmits information while maintaining electrical isolation therebetween. Photocoupler 53 may be replaced with a transformer.

Figure 16:
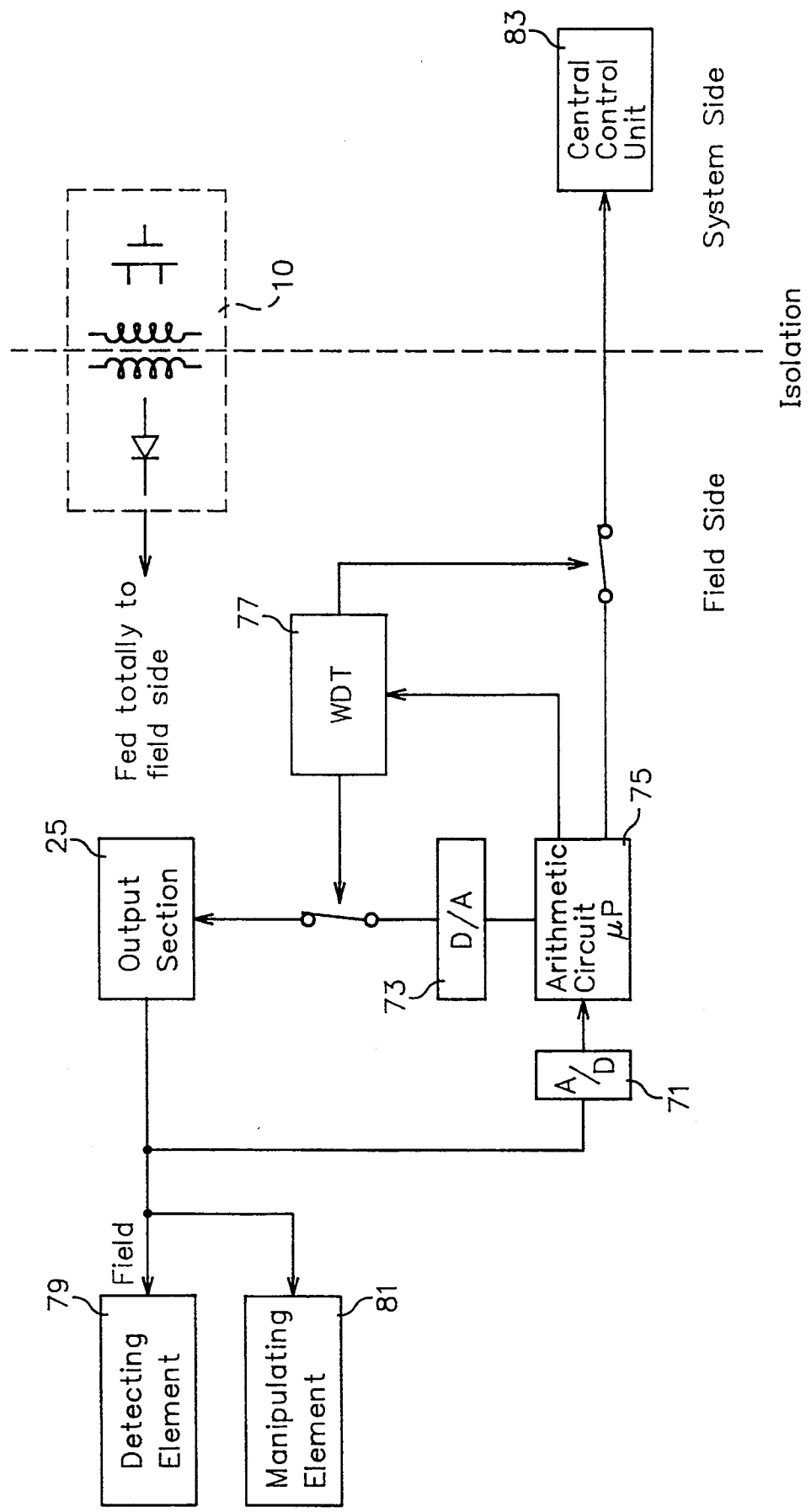
FIG. 16 is a block diagram depicting a known control unit used industrially.

FIG. 16 shows a conventional industrial control unit wherein a power supply 10 feeds power to the entire field side. The power supply includes an ADC 71 for converting an output signal from a sensor into digital form, and a D/A converter 73 for converting the digital signal into analog form, for use in an analog communication network. An arithmetic unit 75 may comprise a microprocessor. A WDT 77 is used to monitor the state of operation of the microprocessor. An output section 25 is a load, as viewed from the power supply. Output section 25 produces an instrumentation signal of 4 to 20 mA to the field side.

Generally, a detecting element 79, such as a flow meter or a pressure gauge, is installed in the field. Also, a manipulating element 81, such as a valve, is provided. The system is equipped with a central control unit 83 which reads an output signal from detecting element 79 or which displays the state of operation of manipulating element 81, and which monitors the state of operation of the entire plant. The control unit is disposed between the field equipment and the system. Control unit 83 controls the field equipment assigned to the unit according to detailed instructions from the system. In this case, the signal line is electrically insulated because dangerous material, such as oil, may be treated in the control process.

The control unit must be a fail-safe type system which minimizes the effects on the outside when a trouble occurs or at the start of energization. In particular, when energization is being carried out, and the internal state is not yet settled, if the masking function, or any one of the electronic circuits forming the control unit has a fault, abnormal control output signals are not sent to field elements 79,81 connected to the output. Also, the bus on the system side is not isolated, and trouble is localized. Furthermore, trouble in field elements 79,81 will not cause damage to the entire system.

In the apparatus of FIG. 16, abnormality in the microprocessor is detected by WDT 77. When an abnormality is detected, the microprocessor is disconnected from the control output or system. In order to prevent the field equipment or system from being affected by any uncertain internal state during energization, emphasis is placed on the transient characteristics in designing the appratus. Electrical isolation is provided between the field side and the system side so that if there is a leakage, trouble, or the like, in the field side, the entire system, including the system side, is not affected by such leakage, trouble or the like.

However, where there is a fault in any one of the transistors disposed at the output stage located inside the output section 25 and producing the control output, and such fault is detected by monitoring the control output, if the transistor having a fault is conducting, then it is imposible to cut off the control output. Furthermore, where emphasis is placed on the transient characteristics, the apparatus is complex because it is necessary to utilize the logical states of the logic elements.

Figure 17:
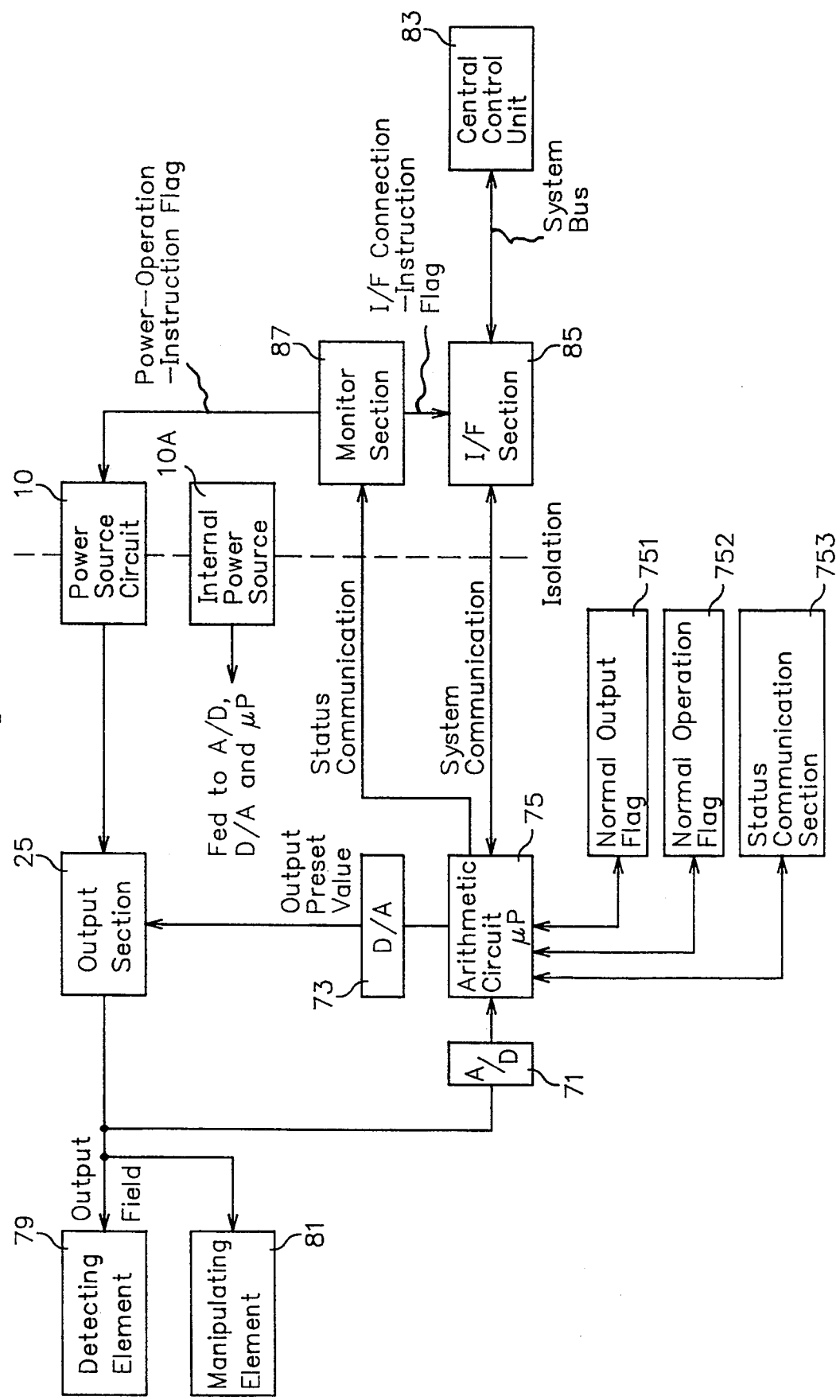
FIG. 17 is a block diagram depicting a fifth illustrative embodiment of the invention.
Figure 18:
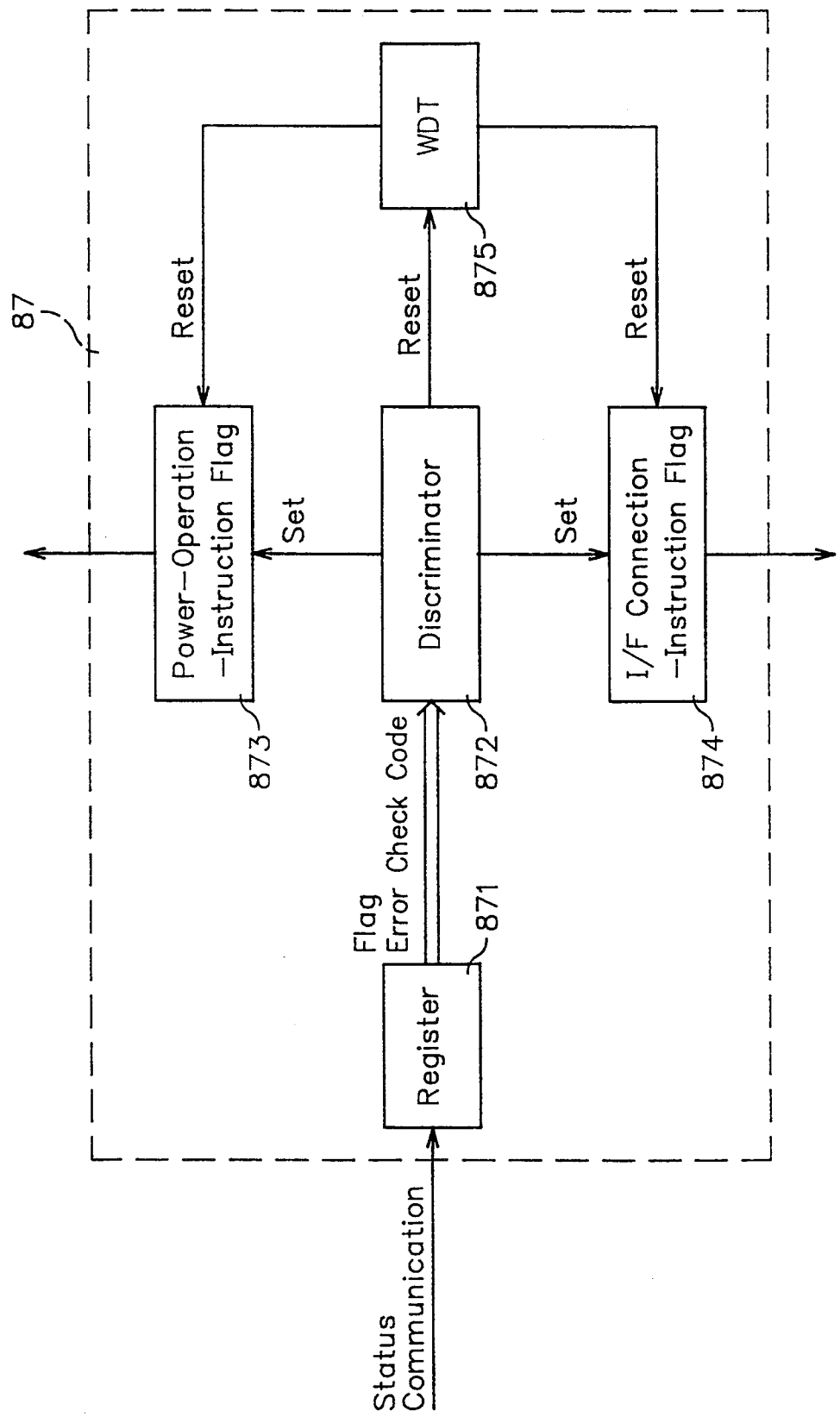
FIG. 18 is a block diagram depicting the monitor section 87 of FIG. 17.

In the next illustrative embodiment of FIGS. 17,18, even if the control output section 25 contains a fault, the power supply using a digital feedback signal according to the invention assures that the output is disconnected. Also, the transient characteristics can be easily designed to avoid any problems. Various examples of such control apparatus of the invention are discussed hereinafter.

FIG. 17 shows a fifth illustrative embodiment, and FIG. 18 shows a monitor section 87 used in such embodiment. In FIG. 17, an output section 25 produces a voltage signal or a current signal to the field side. The signal can be an analog instrumentation signal of 4 to 20 mA or 1–5 volts. A power source circuit 10 supplies electrical power to the output section 25 to cause operation thereof. Power source circuit 10 is turned ON and OFF by a signal from a power operation instruction flag 873 (see FIG. 18). An internal power source 10A feeds power to an arithmetic circuit 75 etc., irrespective of the power-operation-instruction flag 873, to permit continuous operation of the control unit itself. In the embodiment, if the power supply, described already in conjunction with FIG. 2, used in the power source circuit 10 and in the internal power source 10A, then coupling to the instruction flag 873 is easily accomplished.

Arithmetic circuit 75 comprises an ordinary microprocessor, a ROM, a RAM, and other components. ADC 71 converts the output signal from output section 25 into digital form and supplies the digital output signal to arithmetic circuit 75. DAC 73 converts an instruction value generated by arithmetic circuit 75 into analog form and sends the analog instruction values to output section 25. Arithmetic circuit 75 calculates an output instruction value either from the instruction value sent from the system or in accordance with a predetermined rule or program. A normal output flag 751 provides a display to indicate whether the output preset value is coincident with the output signal from the output section 25. In this manner, trouble in any of the transistors in the output section 25 or a short circuit in the field equipment is detected. A normal operation flag 752 performs a predetermined calculation for self-diagnosis and provides a display to indicate whether arithmetic circircuit 75 itself is performing the calculations normally. In this manner, trouble in arithmetic circuit 75 itself is detected. A status communication section 753 transmits a communication frame, including data about the normal output flag 751, and the normal operation flag 752. At the same time, error check codes are added to make it possible to determine whether the communication frame has been correctly sent to the opposite equipment. Status communication section 753 performs an operation at regular intervals of time and is ready to detect trouble when it occurs.

Monitor section 87 makes a decision according to the status communication from arithmetic circuit 75 to determine whether the entire control unit has a fault. If a trouble occurs, monitor section 87 takes measures to localize the effect of the trouble.

As shown in FIG. 18, a register 871 stores data transmitted from the status communication section 753, by status communication. A discriminator 872 makes a decision to determine whether the communication frame stored in register 871 contains an error. For this purpose, error check codes are used. Power-operation-instruction flag 873 permits supply of power to output section 25 of power source circuit 10 when discriminator 872 regards the communication frame as being correct, and, at the same time, data contained in transmitted normal output flag 751 and data contained in transmitted normal operation flag 752 indicate normality. An interface (I/F) connection-instruction flag 874 is set when the discriminator 872 recognizes the validity of the communication frame and, at the same time, data contained in transmitted normal operatoin falg 752 indicates normality. WDT 875 is rest when discriminator 872 regards the communication frame as being correct. When WDT 875 is not reset for a given time, WDT 87 resets power-operation-instruction flag 873 and I/F connection-instruction flag 874.

Returning to FIG. 17, a system interface (I/F) section 85 connects together an arithmetic circuit 75 and the system. Interface section 85 operation is determined, depending on whether digital signals or analog instrumentation signals of 4 to 20 mA or 1 to 5 volts are used in a serial bus or in a parallel bus, in the system. I/F section 85 permits request for communication from arithmetic circuit 75 to the system, except when I/F connection flag 874 is set. Power source circuit 10 and internal power source 10A provide isolation between the field equipment and the system.

The operation of the embodiment of FIGS. 17 (and 18) is described hereinafter with reference to FIGS. 19(A)–19(L), which show waveforms illustration operation under normal conditions. FIG. 19(A) shows an output signal which is an analog instrumentation signal. FIG. 19(B) shows power supplied to output section 25 from power source circuit 10. FIG. 19(C) illustrates operation of arithmetic circuit 75. FIGS. 19(D), 19(D1) and 19(D2) illustrate the contents of status communication (19D), including normal output flag (19D1) and normal operation flag (19D2). FIG. 19(E) illustrates system communication. FIG. 19(F) illustrates power-operation-instruction flag 873. FIG. 19(G) illustrates interface connection flag 874. FIG. 19(H) illustrates the condition of monitor section 87. FIG. 19(I) illustrates the condition of internal power source 10A. FIG. 19(J) illustrates the condition of power source circuit 10. FIG. 19(K) illustrates the condition of system interface section 85. FIG. 19(L) illustrates the condition of the system bus.

When the control unit is energized, internal power source 10A begins to feed power to ADC 71, DAC 73, and arithmetic circuit 75 (shown as $\mu P$). Then, arithmetic circuit 75 starts self-diagnosis operation. Meanwhile, monitor section 87 stops operation of both power source circuit 10 and system interface section 85, using power-operation-instruction flag 873 and the interface connection flag 874. Thus, unwanted disturbance does not occur in the field equipment or in the system. Blockage in the system communication means that access to the system is prohibited during self-diagnosis of arithmetic circuit 75.

Arithmetic circuit 75 records the results of self-diagnosis in normal operation flag 752, activates status communication section 753, and sends the results to monitor section 87. Monitor section 87 receives the status communication and sets power-operation-instruction flag 873 and interface connection flag 874, taking into account the results of diagnosis made by discriminator 872 and the contents of normal output flag 751 and of normal operation flag 752. In response, power source circuit 10 starts the supply of power. Output section 25 begins to produce an output to the field equipment. Also, operation of system interface section 85 is commenced. Thus, data and instructions are transmitted between the field equipment and the system. Such self-diagnosis of arithmetic circuit 75 is conducted periodically. The above-described series of operations is repeated whenever self-diagnosis is desired.

FIGS. 20(A)-20(L), show waveforms illustrating operation of output section 25 when there is a fault therein during energization. The waveforms of FIGS. 20(A)-20(L) are similar to those of FIGS. 19(A)-19(L), respectively, in that FIGS. 20(A)-20(L) are the same until self-diagnosis operation is started, but when normal operation flag 751 indicates an abnormality. Monitor section 87 receives the status communication, keeps the power-operation-instruction flag 873 rest, taking into account the results of diagnosis made by discriminator 872 and the contents of the normal output flag 751 and of the normal operation flag 752, and sets the interface connection flag 874. In response, power source circuit 10 is kept inoperative. Output section 25 produces no output signal to the field equipment. On the other hand, system interface section 85 begins to operate and informs the system of an abnormality in output section 25.

FIGS. 21(A)-21(L) show waveforms of signal produced when the arithmetic function of the arithmetic circuit 75 is found to contain a fault during energization. FIGS. 21(A)-21(L) are waveforms of the designations of FIGS. 19(A)-19(L), respectively. Similar operations are carried out when normal status communication or system communication cannot be effected. FIGS. 21(A)-21(L) are the same as FIGS. 19(A)-19(L), until self diagnosis operation is started and when normal operation flag 752 indicates abnormality. Monitor section 87 then receives the status communication and keeps the power-operation-instruction flag 873 and the interface connection flag 874 reset, taking into account the result of the diagnosis made by discriminator 872 and the contents of normal output flag 751 and of normal operation flag 752. In response, power source circuit 10 is maintained inoperative. Output section 25 produces no output signal to the field equipment. Also, system interface section 85 is kept disconnected and is not capable of communicating with the system. Arithmetic circuit 75 continues the self diagnosis operation until the abnormality is no longer detected. This prevents unwanted disturbances in the field equipment and in the system.

In control circuit 30, the signal transferred from the secondary side to the primary side takes a digital form. In the prior art, the signal assumes an analog form. Transmission of information by means of a digital signal offers higher reproducibility and higher stability than transmission of information by means of an analog signal. Also, higher reliability is obtained even where the power supply is provided under strict conditions. As described in the embodiment of FIG. 17, where the novel switching power supply is incorporated in a modern digitalized electronic apparatus, the invention has high affinity with the signal from the switching power supply because the signal fed back from the power supply is digitalized. Thus, where both need to be coupled together, they can be both easily so designed.

In the first and second illustrative embodiments, signals are transmitted through P/S converter 51, photocoupler 53, and S/P converter 37. Thus, if the amount of information transferred between the secondary side and the primary side increases, the information can be transmitted while providing isolation therebetween by use of a single photocoupler or isolating element. It is not necessary to add any more photocouplers or isolating elements, as is necessary in conventional switching power supplies. This reduces the cost of switching power supplies. Also, the mounting arrangement for such switching power supplies can be readily designed.

In the third and fourth illustrative embodiments, where high output resolution is required by the use of digital modulator 69, a control circuit for the switching power supply can be built simply by changing the bit width n of control circuit 30. Thus, the control output from digital arithmetic unit 63 can be transmitted to digital modulator 69 without use of DAC 65 which would have been needed in conventional switching power supplies. Consequently, a switching power supply can be obtained which is inexpensive and simple in structure.

In the fifth illustrative embodiment, if output section 25 has a fault, arithmetic circuit 75 indicates the fault by use of the normal output flag 751. A signal indicating the fault is supplied to monitor section 87. The supply of power from source 10 is stopped by power-operation-instruction flag 873, whereby the operation of output section 25 is stopped. This assures that supply of abnormal output signal to the field equipment is prevented.

The foregoing description is illustrative of the principles of the invention. Numerous extensions and modifications thereof would be apparent to the worker skilled in the art. All such modifications and extensions are to be considered to be within the spirit and scope of the invention.

What is claimed is:

1. A control unit comprising
   output circuit means for producing an output signal;
   analog-to-digital converter means for converting said output signal from output circuit means into digital form;
   digital-to-analog converter means for converting an output instruction value into analog form and for supplying the resulting analog signal to said output circuit means;
   arithmetic means for calculating an output instruction value either from an instruction value sent from a system or according to a predetermined control rule, wherein said arithmetic means contains a normal output flag, a normal operation flag, and a status communication section, said normal output flag indicating whether an output preset value agrees with an output signal from said output circuit means, said normal operation flag indicating whether a predetermined calculation has been correctly performed, said status communication section acting to transmit a communication flag containing data about said normal output flag and normal operation flag;

monitoring means comprising
register means for storing data transmitted by said status communication;

discriminator means for deciding whether a communication frame stored in said register means contains an error;

power-operation-instruction flag means for permitting supply of power to said output circuit means when said discriminator means determines that the communication frame is correct and both a transmitted normal output flag and a transmitted normal operation flag indicate normality;

interface connection instruction flag means which is set when said discriminator means determines that said communication frame is correct, and the transmitted normal operation flag indicates normality; and watchdog timer means for performing resetting when said discriminator means determines said communication frame to be correct, and for resetting said power-operation-instruction flag means and said interface connection flag means when said resetting operation is not performed for a given amount of time;

isolating means for isolating said status communication section from said register means; and system interface means for connecting said arithmetic means and said system; wherein
said system interface means permits communication between said arithmetic means and said system except when said interface connection flag means is set.

2. A switching power supply comprising
transformer means comprising primary winding means and secondary winding means;

converter means for turning ON and OFF voltage applied across said primary winding means, and for rectifying and smoothing voltage induced in said secondary winding means to supply an output voltage to a load, said converter means comprising a switching device means;

analog-to-digital converter means for converting a signal representing said output voltage from said converter means into digital form with a bit length sufficient to stabilize said output voltage;

parallel to series converter means for converting a bit train signal into a serial pulse train signal, said bit train signal including an output signal from said analog-to-digital converter means;

isolating means for transferring said serial pulse train signal to said primary winding means and for isolating said serial pulse train signal;

serial to parallel converter means for demodulating said serial pulse train signal into a parallel signal;

arithmetic means for receiving said parallel signal corresponding to an output signal of said converting means, and for deriving an error signal which is representative of a difference between an output signal in digital form from said analog-to-digital converter means and a preset value, and for digitally calculating a control output signal;

digital modulator means for receiving said control output signal from said arithmetic means, and for producing a one bit train signal; and wherein said switching device means is turned ON and OFF according to said one bit train signal from said digital modulator means.

3. The device of claim 2, wherein
said digital modulator means receives a clock signal which gives a reference time for sampling; and wherein
said digital modulator means comprises
comparator means for comparing and for producing an output signal in response to a clock signal;

an adding-subtracting means for producing a difference between said output signal from said comparing means and a control output signal; and an integrator means for integrating an output from said adding-subtracting means at each clock signal, and for feeding an integrated output back to said comparator means; and wherein said output signal from said comparing means is used to turn ON and OFF said switching device means; and wherein said output signal from said comparator means has an average value which is proportional to said control output signal.

4. The device of claim 2, wherein
said parallel to series converter means comprises an excessive output detector means for monitoring an output current or voltage from said converter means, and for producing a flag signal indicating the presence or absence of an overcurrent or an overvoltage, wherein a serial signal from said parallel to series converter means contains said flag signal; and wherein said control means stops said switching device means from being turned ON and OFF when said overcurrent or overvoltage is present according to data about the contents of said flag signal.

* * * * *